(12) United States Patent
Hoare et al.

(10) Patent No.: US 9,603,477 B2
(45) Date of Patent: Mar. 28, 2017

(54) SOUS VIDE DEVICE

(71) Applicant: Breville Pty Limited, Botany, NSW (AU)

(72) Inventors: Richard Hoare, Lane Cove (AU); Brendan John Foxlee, Earlwood (AU); Vyvyan Rose, Vaucluse (AU); Garth Ryan, Helensburgh (AU); Pierce James Barnard, Cherrybrook (AU)

(73) Assignee: Breville Pty Limited, Alexandria, New South Wales (AU)

( * ) Notice: Subject to any disclaimer, the term of this patent is extended or adjusted under 35 U.S.C. 154(b) by 260 days.

(21) Appl. No.: 14/418,439

(22) PCT Filed: Jul. 31, 2013

(86) PCT No.: PCT/AU2013/000841
§ 371 (c)(1),
(2) Date: Jan. 29, 2015

(87) PCT Pub. No.: WO2014/019018
PCT Pub. Date: Feb. 6, 2014

(65) Prior Publication Data
US 2015/0257574 A1 Sep. 17, 2015

(30) Foreign Application Priority Data

Jul. 31, 2012 (AU) .............................. 2012903267

(51) Int. Cl.
*A47J 27/10* (2006.01)
*A23L 5/10* (2016.01)

(52) U.S. Cl.
CPC ............. *A47J 27/10* (2013.01); *A23L 5/13* (2016.08); *A23L 5/15* (2016.08); *A23L 5/17* (2016.08); *A23V 2002/00* (2013.01)

(58) Field of Classification Search
CPC ............... A47J 27/10; A23L 5/13; A23L 5/17
See application file for complete search history.

(56) References Cited

U.S. PATENT DOCUMENTS

| 1,063,609 | A | * | 6/1913 | Shaw | A47J 37/1295 |
| | | | | | 126/273.5 |
| 2,452,657 | A | * | 11/1948 | Hooper | A47J 37/1214 |
| | | | | | 99/343 |
| 2,500,396 | A | * | 3/1950 | Barker | A23B 5/0052 |
| | | | | | 134/142 |
| 3,791,285 | A | * | 2/1974 | Mack | A47J 29/00 |
| | | | | | 99/419 |

(Continued)

*Primary Examiner* — Sean Michalski
(74) *Attorney, Agent, or Firm* — Michael Molins

(57) ABSTRACT

A sous vide device and method for cooking food. The device including: a reservoir for retaining water; a user interface having one or more user input elements and a display element; a heating element for heating water in the reservoir; a temperature sensor element for providing a temperature signal indicative of water temperature in the reservoir; and a processor module, the processor module being coupled to the user interface for receiving user inputs; the processor module being coupled to the temperature sensor element for receiving the temperature signal; the processor module enables control of the heating element for regulating the temperature of water in the reservoir.

13 Claims, 28 Drawing Sheets

(56) References Cited

U.S. PATENT DOCUMENTS

| | | | | |
|---|---|---|---|---|
| 4,560,572 A * | 12/1985 | Watanabe | A23L 19/09 | 241/46.11 |
| 4,617,860 A * | 10/1986 | Blaylock | A47J 43/20 | 426/523 |
| 4,812,625 A * | 3/1989 | Ceste, Sr. | A47J 37/1266 | 219/442 |
| 5,097,759 A * | 3/1992 | Vilgrain | A47J 17/18 | 219/441 |
| 5,445,062 A * | 8/1995 | Polster | A47J 27/10 | 366/107 |
| 5,540,944 A * | 7/1996 | Reutimann | A23L 13/57 | 426/289 |
| 5,542,344 A * | 8/1996 | Koether | A23L 3/375 | 392/445 |
| 6,162,478 A * | 12/2000 | Koch | A23L 15/00 | 426/298 |
| 9,074,948 B2 * | 7/2015 | Rankin | G01K 13/00 | |
| 2003/0070560 A1 * | 4/2003 | Damrath | A47J 29/00 | 99/440 |
| 2008/0066624 A1 * | 3/2008 | Taylor | A47J 27/10 | 99/330 |
| 2011/0185915 A1 * | 8/2011 | Eades | A47J 27/004 | 99/331 |
| 2012/0258218 A1 * | 10/2012 | Koyun | A23B 5/0052 | 426/298 |
| 2013/0112683 A1 * | 5/2013 | Hegedis | A47J 27/62 | 219/660 |
| 2015/0257573 A1 * | 9/2015 | Gabara | A47J 27/10 | 99/337 |
| 2015/0289544 A1 * | 10/2015 | Mendonca Vilela Pinto Ferreira | A23L 1/0121 | 426/232 |
| 2016/0014849 A1 * | 1/2016 | Hegedis | H05B 6/1263 | 219/627 |
| 2016/0081372 A1 * | 3/2016 | Pinto Ferreira | A47J 24/04 | 426/231 |
| 2016/0174748 A1 * | 6/2016 | Baldwin | A47J 27/10 | 426/231 |
| 2016/0220058 A1 * | 8/2016 | Rocklinger | A47J 27/04 | |

\* cited by examiner

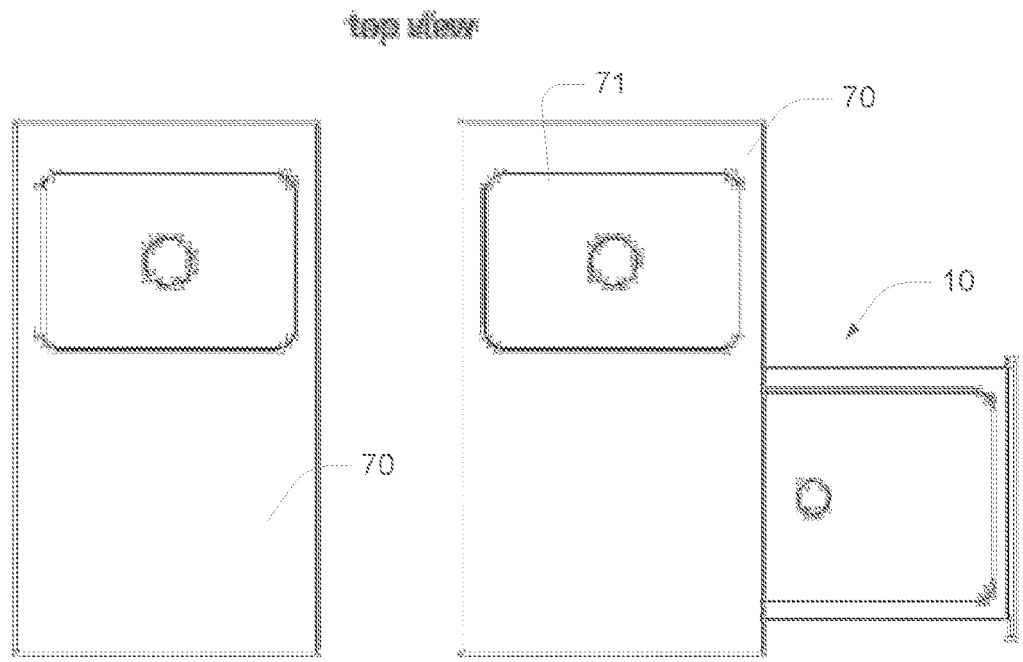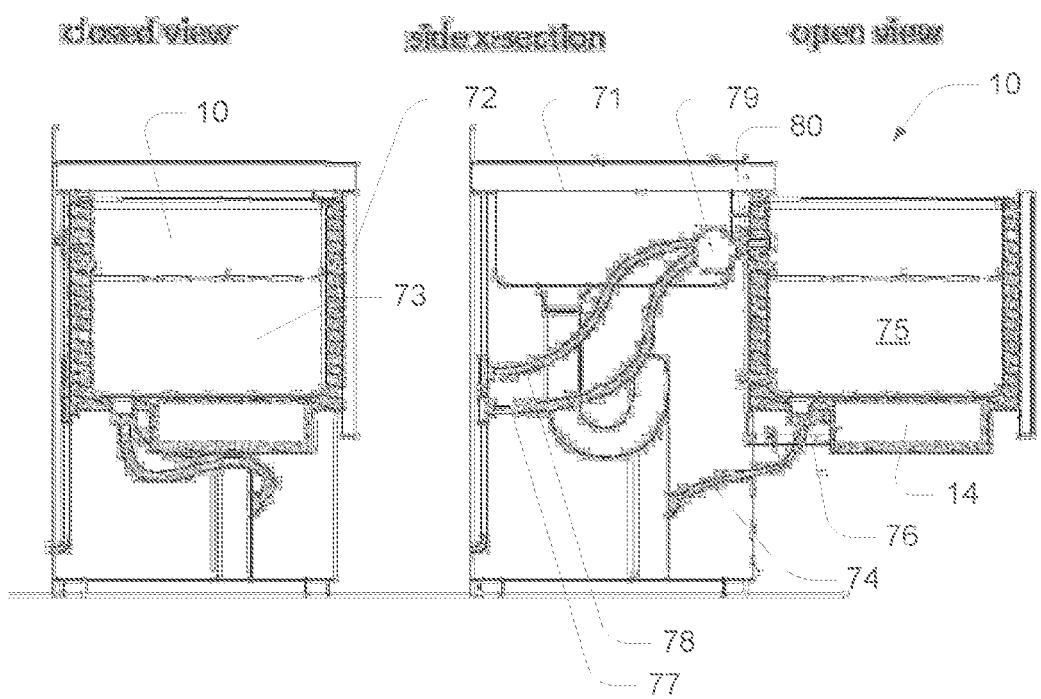
FIG. 7

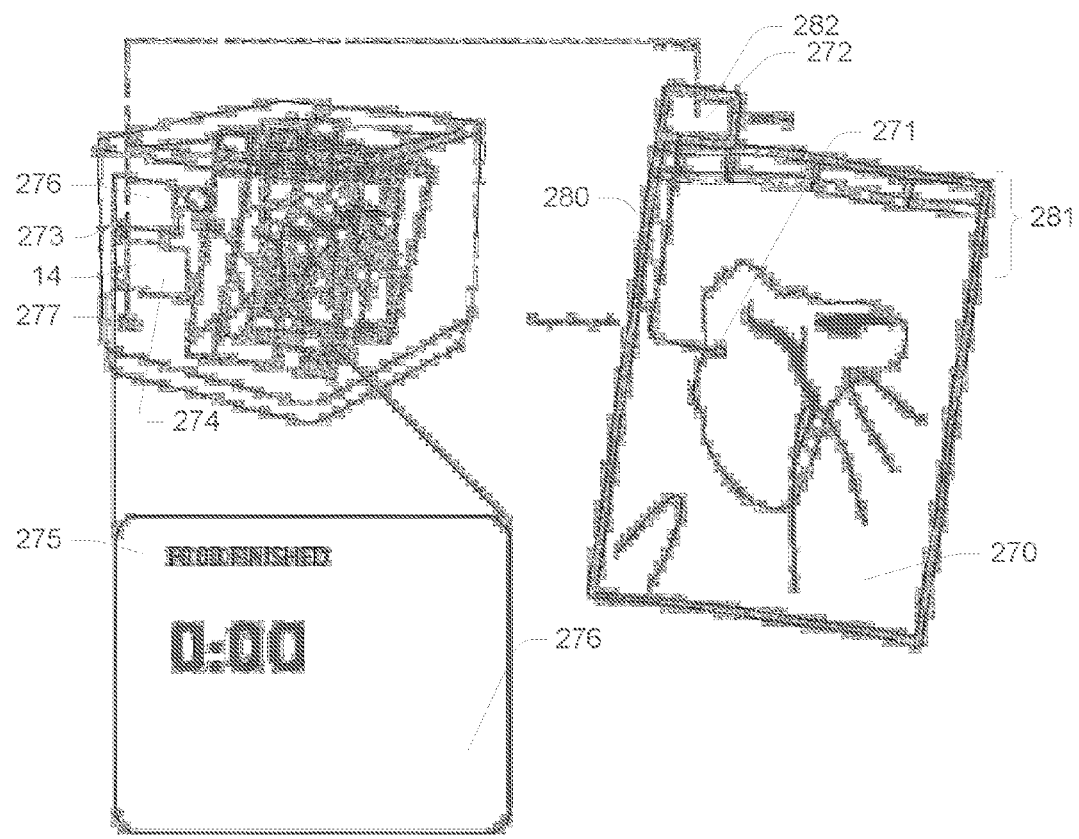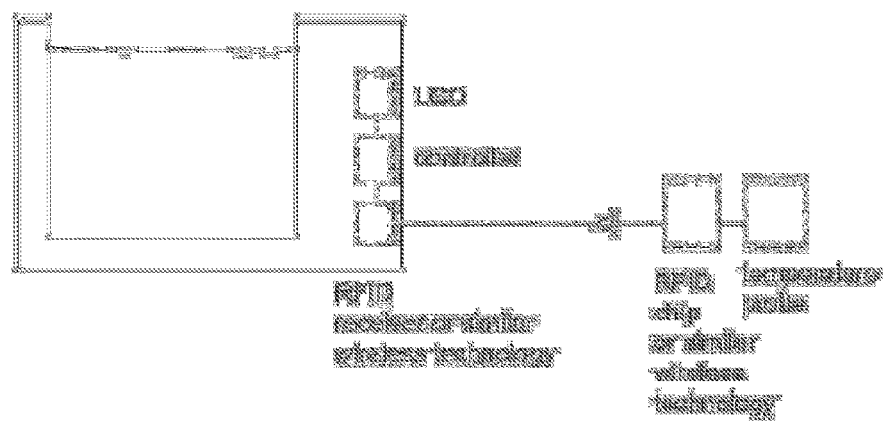
FIG. 23

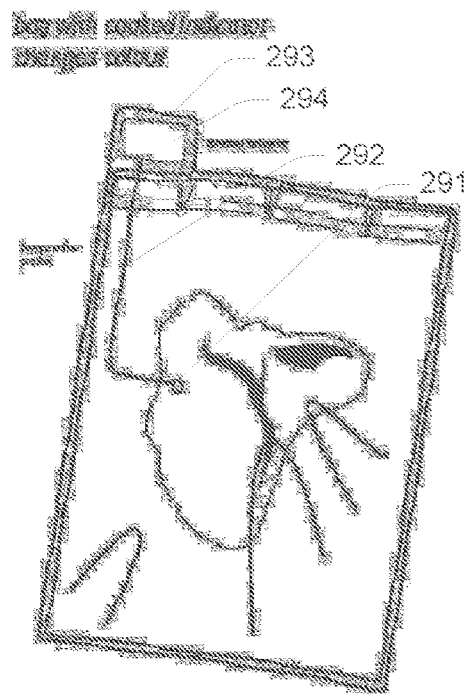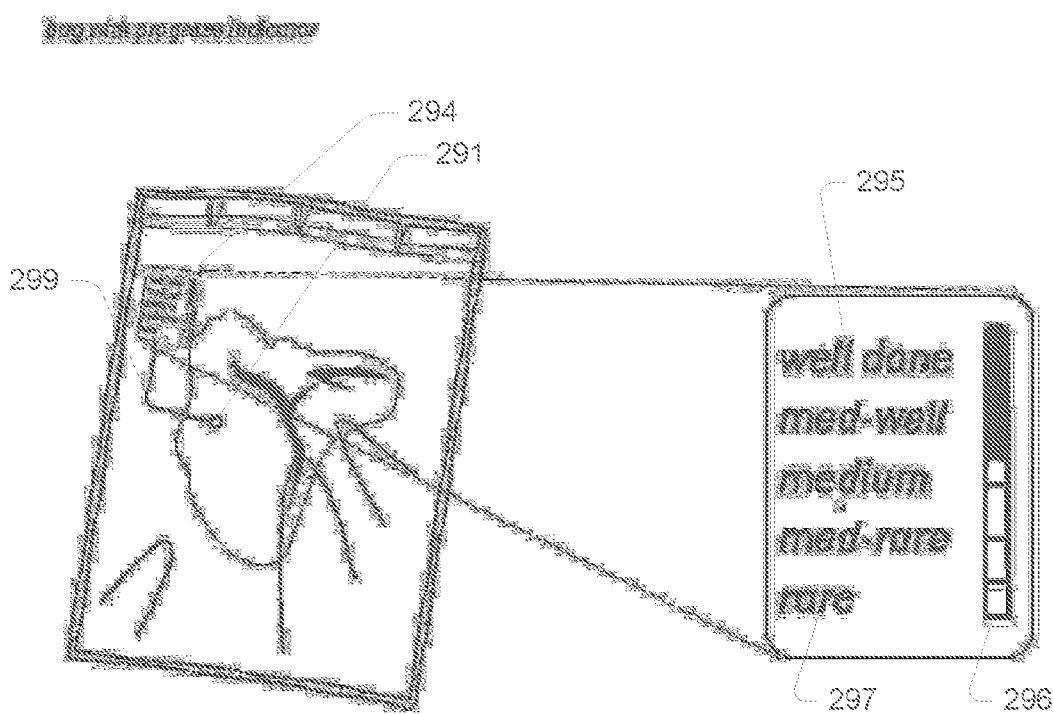
FIG. 24

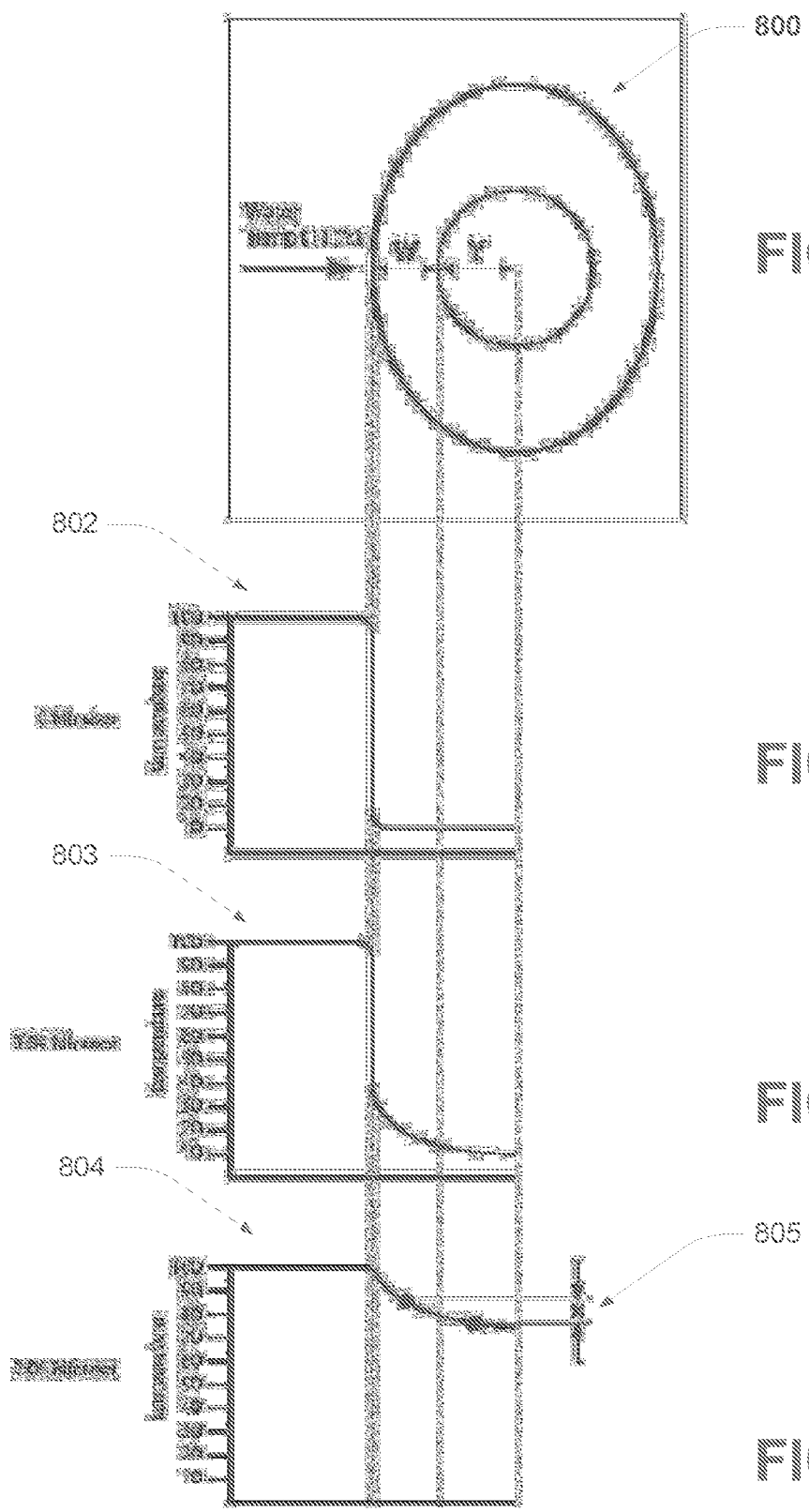

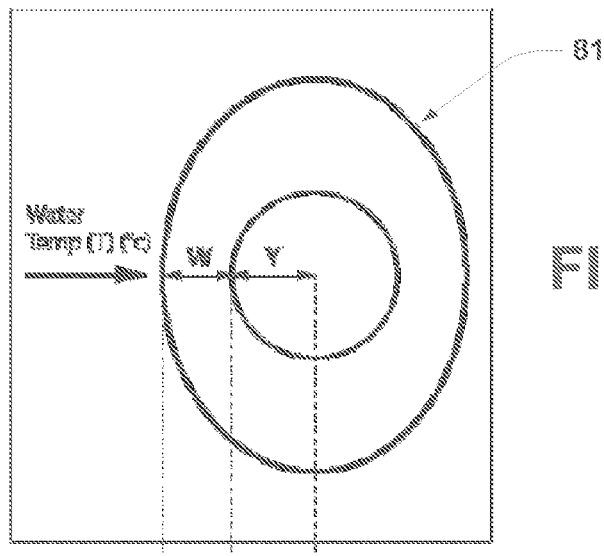
FIG. 32A
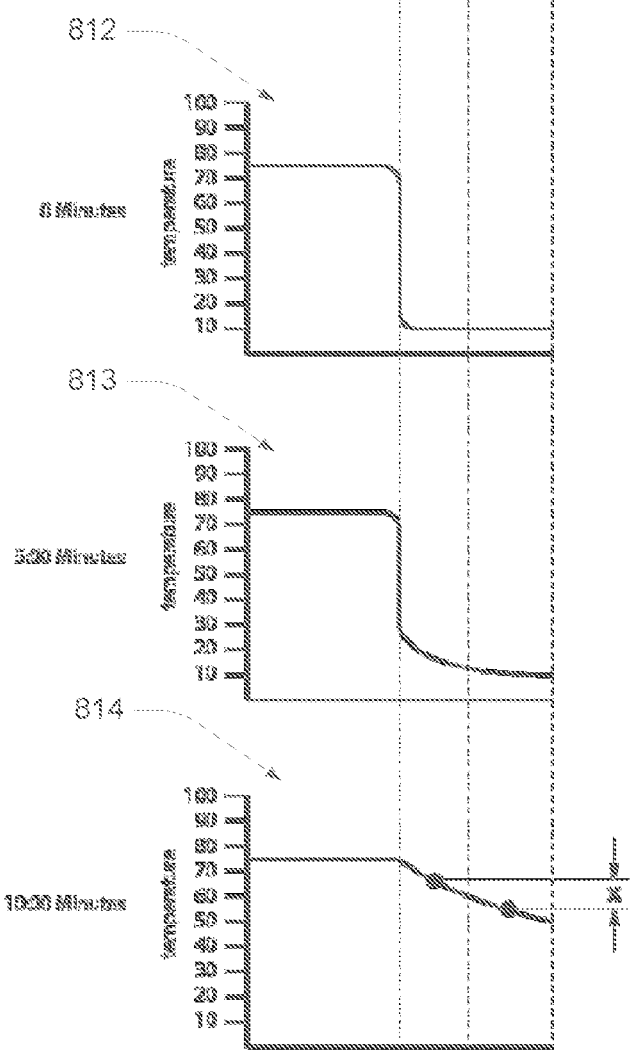
FIG. 32B
FIG. 32C
FIG. 32D

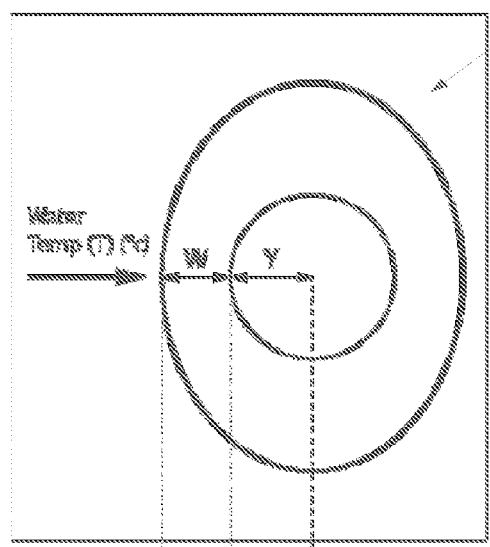
FIG. 33A
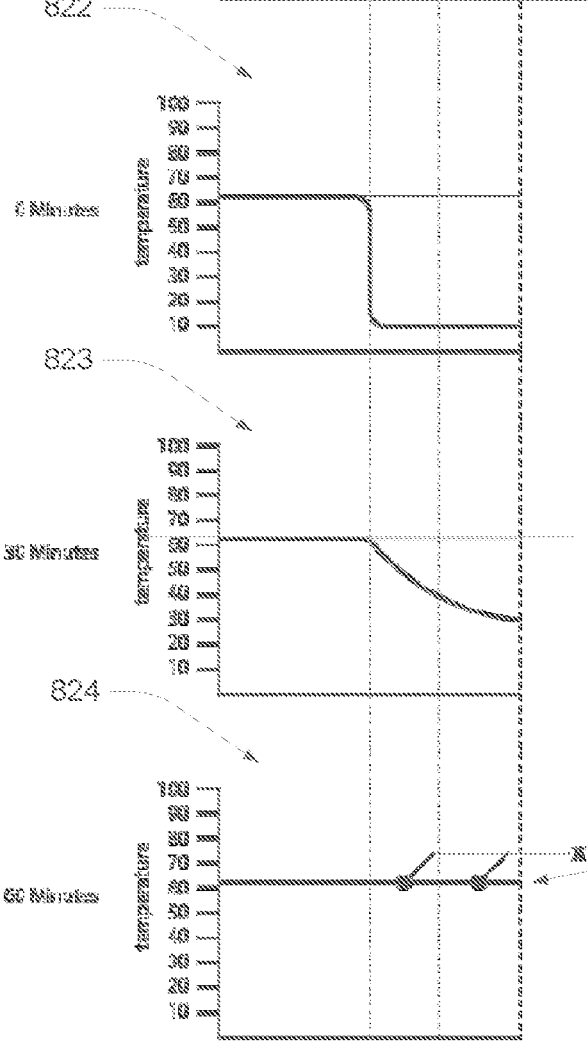
FIG. 33B
FIG. 33C
FIG. 33D

SOUS VIDE DEVICE

FIELD OF THE INVENTION

The invention, relates to domestic cooking appliances, and more particularly to a domestic sous vide device.

The invention has been developed primarily for use as a domestic sous vide device and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

A sous vide device (French for "under vacuum") is a method of cooking food in sealed plastic bags in a water bath. The purpose of sous vide cooking is too cook an item, evenly, but over cook it and to retain, moisture and flavour. Sous Vide uses temperature considerably lower then covenantal cooking. Sous Vide cooking of meet is capable of hydrolysing tough connective tissue into gelatine without heating the protein in the meat to the point that they denature and become tough. Sous vide cooking of vegetables allows the vegetables to be cooked below the boiling point of water while maintain a firm texture. Food places in a sous vide water bath, cannot become hotter than the bath, it is in. Accordingly, sous vide prevents overcooking and promotes even cooking with irregularly shaped or thick items.

Because of the long cooking times, it would be an advantage is sous vide cooking to cook multiple and different food items simultaneously. Because sous vide cooking requires submersion of the food in a bag from which, the air the air has been excluded, it would be advantageous to provide a sous vide cooker with a built in or integral vacuum pump. Further, because the exclusion of the air in the bag is sometimes incomplete, it is an advantage to provide a sous vide cooker that can submerge bags that tend to float.

OBJECT OF THE INVENTION

It is an object of the present invention to overcome or ameliorate at least one of the disadvantages of the prior art, or to provide a useful alternative.

It is an object of the invention in its preferred form to provide a sous vide cooker.

It is an object of the invention in its preferred form to provide a sous vide cooker for cooking eggs.

SUMMARY OF THE INVENTION

According to an aspect of the invention, there is provided a sous vide device for cooking food, the device including:
a reservoir for retaining water;
a user interface having one or more user input elements and a display element;
a heating element for heating water in the reservoir;
a temperature sensor element for providing a temperature signal indicative of water temperature in the reservoir; and
a processor module, the processor module being coupled, to the user interface for receiving user inputs; the processor module being coupled to the temperature sensor element for receiving the temperature signal; the processor module enables control of the heating element for regulating the temperature of water in the reservoir.

According to an aspect of the invention there is provided, a sous vide device for cooking food, the device including:
a reservoir for retaining water;
a user interface having one or more user input elements and a display element;
a heating element for heating water in the reservoir;
a temperature sensor element for providing a temperature signal indicative of water temperature in the reservoir; and
a processor module, the processor module being coupled to the user interface for receiving user inputs; the processor module being coupled to the temperature sensor element for receiving the temperature signal; the processor module enables control of the heating element for regulating the temperature of water in the reservoir,
wherein the processor module controls changes in water temperature while food is cooking; and
wherein, based on user input, the processor determines a cooking profile comprising a plurality of cooking temperatures each having a respective cooking time in the cooking period.

Preferably, the device includes a movable food rack that can be lowered into the reservoir to define a cooking configuration. More preferably, the processor module controls lowering and raising of the food rack. The processor module preferably, raises the food rack at the conclusion of a cooking period. Most preferably, when the processor module determines water in the reservoir has reached a predefined temperature, the mod rack is lowered to commence a cooking period.

Preferably, the user interface enables user input of a food, type; and the processor modulo controls the water temperature and cooking period according to the user selected food type. More preferably, the food type is selected from a predetermined set of available food types. Most preferably, the food type is selected from, any one or more of the set comprising: vegetable; meat; eggs; and custard.

Preferably, the user interface enables user input of a food style; and the processor module controls the water temperature and cooking period according to the user selected food style. More preferably, the food style for a selected food type of eggs is selected from any one or more of the set comprising: soft, medium, hard, and poached. More preferably, the food style for a selected food type includes a level of food doneness.

Preferably, the food style for a selected food type of eggs includes an egg white texture. More preferably, egg white texture is selected from any one or more of the set comprising: firm; medium; soft; and just set.

Preferably, the food style for a selected food type of eggs includes an egg yoke texture. More preferably, egg yoke texture is selected from any one or more of the set comprising: hard; medium; soft; and runny.

Preferably, the food style for a selected food type of eggs includes user selection of an egg white texture and an egg yoke texture; wherein the processor module determines a corresponding cooking temperature and a corresponding cooking time. More preferably, the corresponding cooking temperature and the corresponding cooking time are predetermined for the selected combination of egg white texture and egg yoke texture.

Preferably, the processor module controls changes in water temperature while food is cooking. More preferably, the processor module controls changes in water temperature during a cooking period. Most preferably, the processor module controls changes in water temperature during a cooking period based on a predetermined cooking configuration.

Preferably, based on user input, the processor determines a cooking profile comprising a plurality of cooking temperatures each having a respective cooking time within the cooking period.

Preferably, based on user input, the processor determines a cooking profile comprising a predetermined sequence of cooking tempera lures each having a respective cooking time within a single cooking period. More preferably, in a first cycle, a food article is cooked at a first cooking temperature for a first cooking time; and then in a sequenced, second cycle the food, article is cooked at a second, cooking temperature for a second cooking time. Most preferably, the food item is allowed to cool to a third temperature at the conclusion of any cooking cycle.

Preferably, a cooking temperature and a cooking time are predetermined.

Preferably, a cooking temperature and a cooking time are user modified.

Preferably, the processor module is wirelessly coupled to the temperature sensor element.

Preferably, the processor module is wirelessly coupled to the user interface.

Preferably, the device further includes a temperature probe for providing a signal indicative of food temperature; wherein the processor module is coupled to the a temperature probe for receiving the signal indicative of food temperature; such that the processor module, upon determining a food temperature, adjusts the cooking temperature and/or cooking time. More preferably, the processor module is wirelessly coupled to tire temperature probe.

According to an aspect of the invention there is provided a sous vide device for cooking eggs, the device including:
 a reservoir for retaining water;
 a user interface having one or more user input elements and a display element;
 a temperature sensor element, for providing a temperature signal indicative of water temperature in the reservoir;
 a heating element for heating water in the reservoir;
 a processor module, the processor module being coupled to the user interface for receiving user inputs of a food type and a food style; the processor module being coupled to the temperature sensor element for receiving the temperature signal; the processor module controlling operation of the heating element to regulate the temperature of water in the reservoir;
 wherein, upon user selection of an egg food type, user selection of a food style includes selection of an egg white texture and an egg yoke temperature; and
 wherein the processor module determines a corresponding cooking temperature and corresponding cooking time.

According to an aspect of the invention there is provided a user interface for a sous vide device having a reservoir of treated water, tire interlace being coupled to a processor module, the interface including:
 one or more user input elements; and
 a display element;
 wherein the user input elements enable user selection of a cooking profile; and the processor module used, the cooking profile to control cooking temperature and cooking time.

Preferably, the interface enables user input of any one or more of the following: a cooking time; a cooking temperature; a food, type; a food style; a food, weight; and a food shape.

Preferably, the interface is remote from the sous vide device. More preferably, the interface is wirelessly coupled to the sous vide device. Most preferably, the interface comprises an application on a remote device.

Preferably, the interface upon user selection of an egg food type; enables user selection of a food style that includes selection of an egg white texture and an egg yoke texture.

Preferably, the user interface displays a cooking temperature and a cooking time.

BRIEF DESCRIPTION OF THE DRAWING FIGURES

In order that the invention be better understood, reference is now made to the following drawing figures in which:

FIG. 7 illustrates in top and cross section views, a sous vide appliance that is built-in to a cabinet below a bench top;

FIG. 23 illustrates the use of wireless technology to indicate an extent of cooking in a sous vide appliance;

FIG. 24 is a perspective view of a bag for a sous vide cooker having a cooking progress indicator;

FIG. 31A through FIG. 31D show example embodiment temperature profile graphs associate with cooking an egg;

FIG. 32A through FIG. 32D show example embodiment temperature profile graphs associate with cooking an egg; and FIG. 33A through FIG. 33D show example embodiment temperature profile graphs associate with cooking an egg.

BEST MODE AND OTHER EMBODIMENTS

Figure 1:
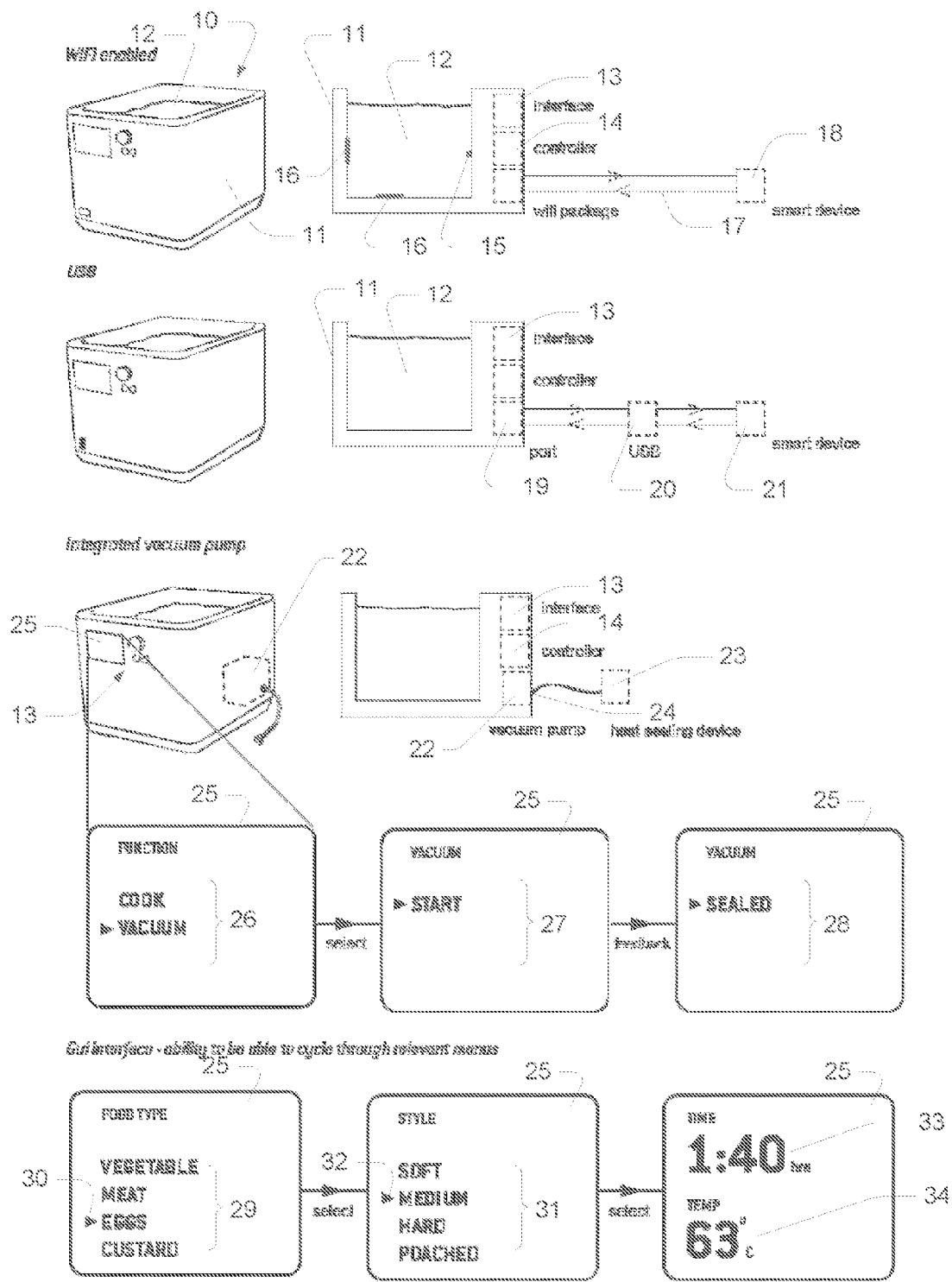
FIG. 1 illustrates in perspective and schematic views, a sous vide cooker and the displays from a user interface of that appliance.

A shown in FIG. 1, a sous vide appliance for domestic use 10 comprises a housing 11 in which is contained a thermally controlled water bath 12. The device 10 includes a user interface 13 having buttons, switches or dials {user inputs} for adjusting the various parameters of the machine. The interface 13 also includes output devices, displays, alarms and warnings, as required. The interface 13 communicates with an electronic controller, microprocessor, MCU or other controlled device 14 that is adapted to determine the temperature that is read by a thermistor 15 that is in proximity to or in contact with water bath 12. The controller uses the determined bath temperature to regulate the delivery of electrical power to a heating element 16. Some or all aspects of the interface can be ported via a WIFI connection 17 to a separate device 18 having user inputs and graphic or audible outputs, as required. In some embodiments, the sous vide device can have a USB output 19 adapted to interface with the USB port 20 of a separate device 21 that can act as the user interface to the device 10. Some embodiments of the invention may have within the housing n, a rather integrated vacuum pump 22. The operation of the vacuum pump 22 can be controlled using the in-dash built controller 14 and user interface 13. The same controller 14 can be used to control a separate heat sealing device 23. That maybe plugged into an outlet or port 24 on an exterior service of the device 10. The user interface 13 may have an alpha numeric display 25. In one displaced state, the display 25 can display the various cooking functions as such, as cook, vacuum and seal 26 that the device can either perform or control using the in-built controller 14. Once an operation commence, the display 25 can determine can display the options available to the user 27 and when complete, the outcome 28. When device functions 26 are displayed, an the user selects "cook", the display can indicate food types 29 and a curser 30 for indicating the appropriate user selection. When a selection such as "eggs" is input to the controller buy a user command, the controller causes the display 13 to display a first level menu of options 31 such as soft, medium, hard or poached. The displayed options 31 can then be associated with a cursor 32 so that the user can input a particular preference. Once the selection is made, the display 25 can provide a graphical indication of time 33, temperature 34 or other variables, in real time if required.

Figure 2:
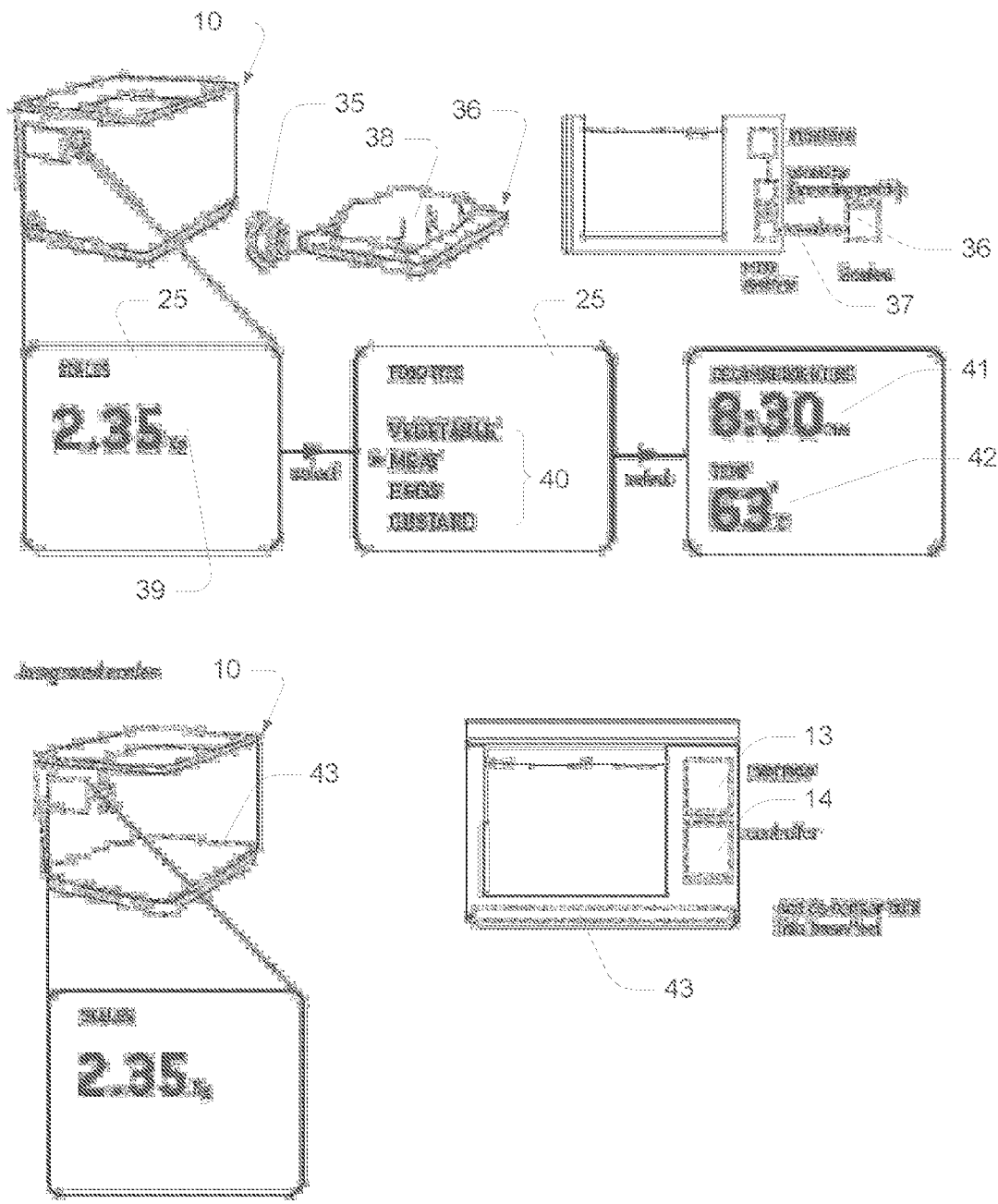
FIG. 2 illustrates in schematic and perspective views a sous vide cooker associated with a scale that it communicates wirelessly.

As shown in FIG. 2, a sous vide device tech may have a wireless communication 35 with a scale 36. The device 10 and scale 36 are both equipped with hardware to perform in a active wireless communication, for example the appropriate WIFI transmitting and receiving antennas, WIFI controller and other hardware may be required. In the alternative, the scale 36 may be connected to the device 10 by hard wiring 37. The scale 36 determines the weight of a sous vide cooking item 38 and transmit the required information to the sous vide device 10. The weight data is transmitted to the controller and the controller may display the determined weight 39 on the display 25. The result of the weighing process, as communicated to the device 10, may be then be integrated to the work flow of the process, for example by alleviating the need for the user to make or input, a further weight information. Accordingly, the display 25 thereafter need only display a food, type 40. User selection of the food type 40 will then generate a display of a recommended cooking time 41 and recommended, cooking temperature 42. In the alternative, the scale 43 may be integrated into the device 10 so as to weigh the water bath and its content both before and after the insertion of a food item 38. The sous vide device can use the weight data to calculate or suggest a cooking time.

Figure 3A:
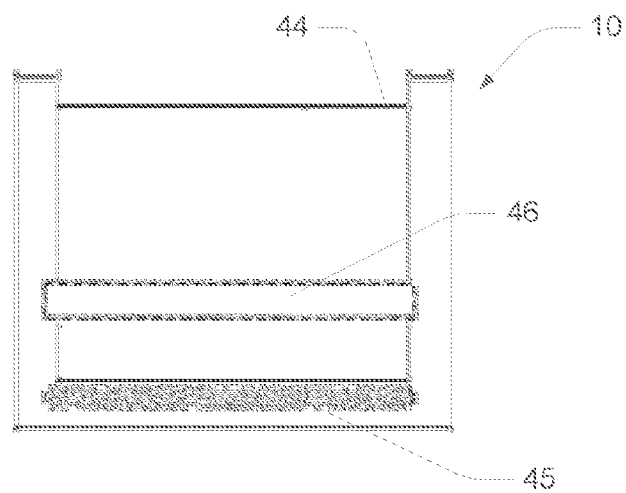
FIG. 3A illustrates both base and circumferential heating elements in this sous vide appliance.

As shown in FIG. 3A, the interior cavity 44 of a sous vide device 10 may be associated with a base heating element 45 (located below the interior 44) or a circumferential slow cooker style heating element banned 46, or both of these. This provides the sous vide cooker with the ability to potentially to act as a traditional slow cooker, deep fryer or rice maker.

Figure 3B:
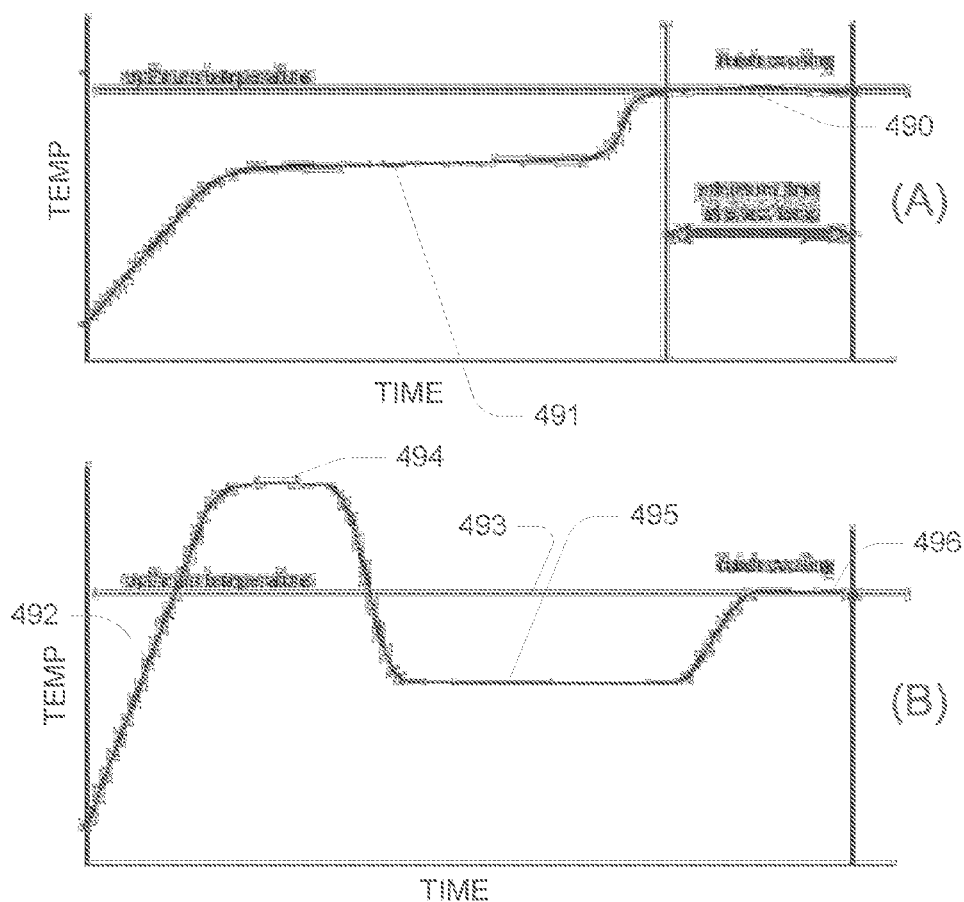
FIG. 3B illustrates grasps of variable temperature cooking in a sous vide appliance.

As shown in FIG. 3B, the controller may alter the bath temperature during a single cooking cycle. In graph (a), a food article is cooked at a maximum or second temperature 490 for an interval, after it has cooked, earlier in the cycle at a lower or first temperature 491. Graph (b) shows a cooking cycle that includes a warming portion 492, then with reference to an optimum continuous sous vide cooking temperature 493, a first higher than the optimal temperature interval 494 followed, by a cooling to a second temperature interval. 495 that is lower than the optimal continuous temperature, then a warming to a third and final temperature interval 496 that is the same as the nominal optimal temperature 493.

Figure 4:
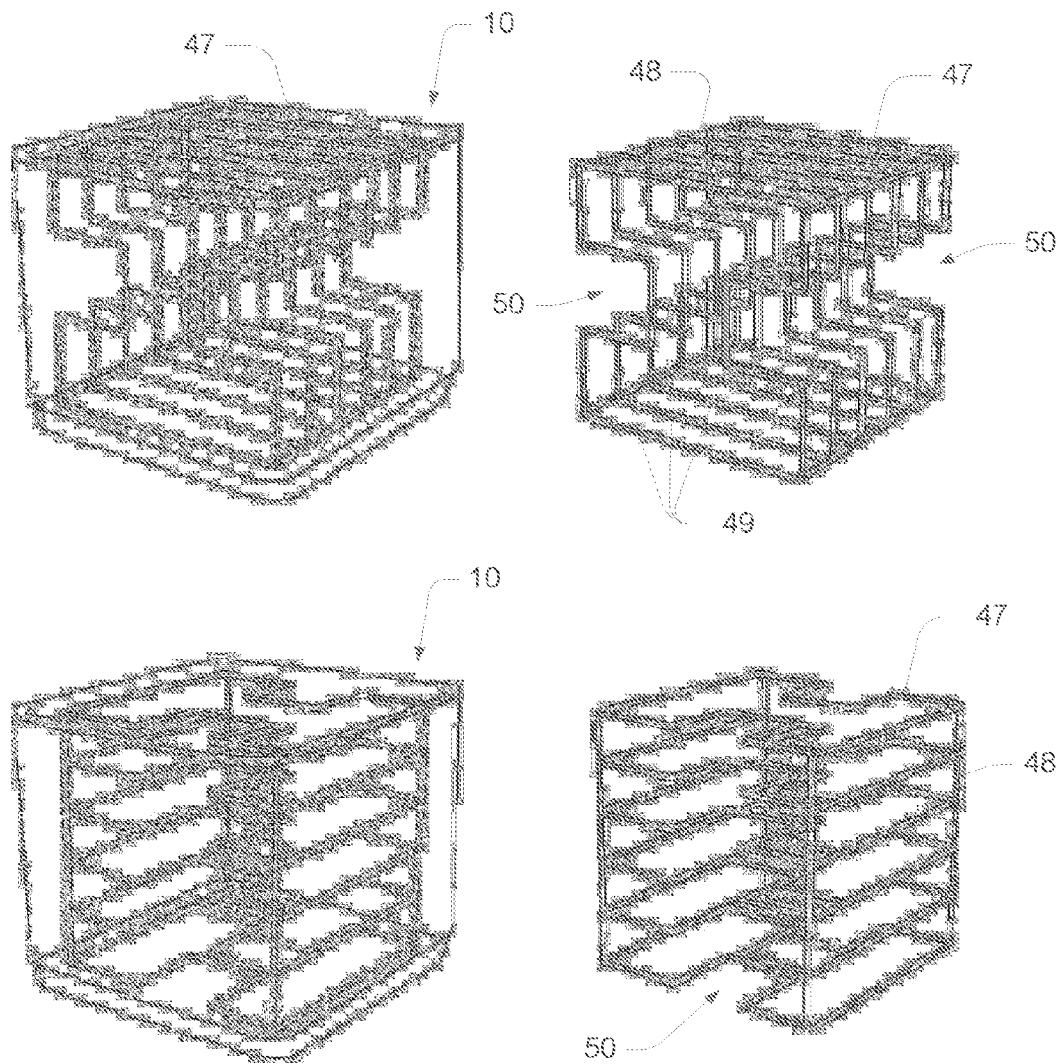
FIG. 4 illustrates, in perspective view, a rack for a sous vide appliance.

As shown in FIG. 4, a sous vide cooking appliance 10 may be provided with an optional internal rack 47. In this example, the rack comprises of 4 parallel corner elements 48 within which individual layers 49 are permanently attached. In this example, the individual layers are "capital H" shaped, each layer having a pair of opposing symmetrical edge indentations 50. The rack is used to contain and separate individual vacuumed bagged food items.

Figure 5:
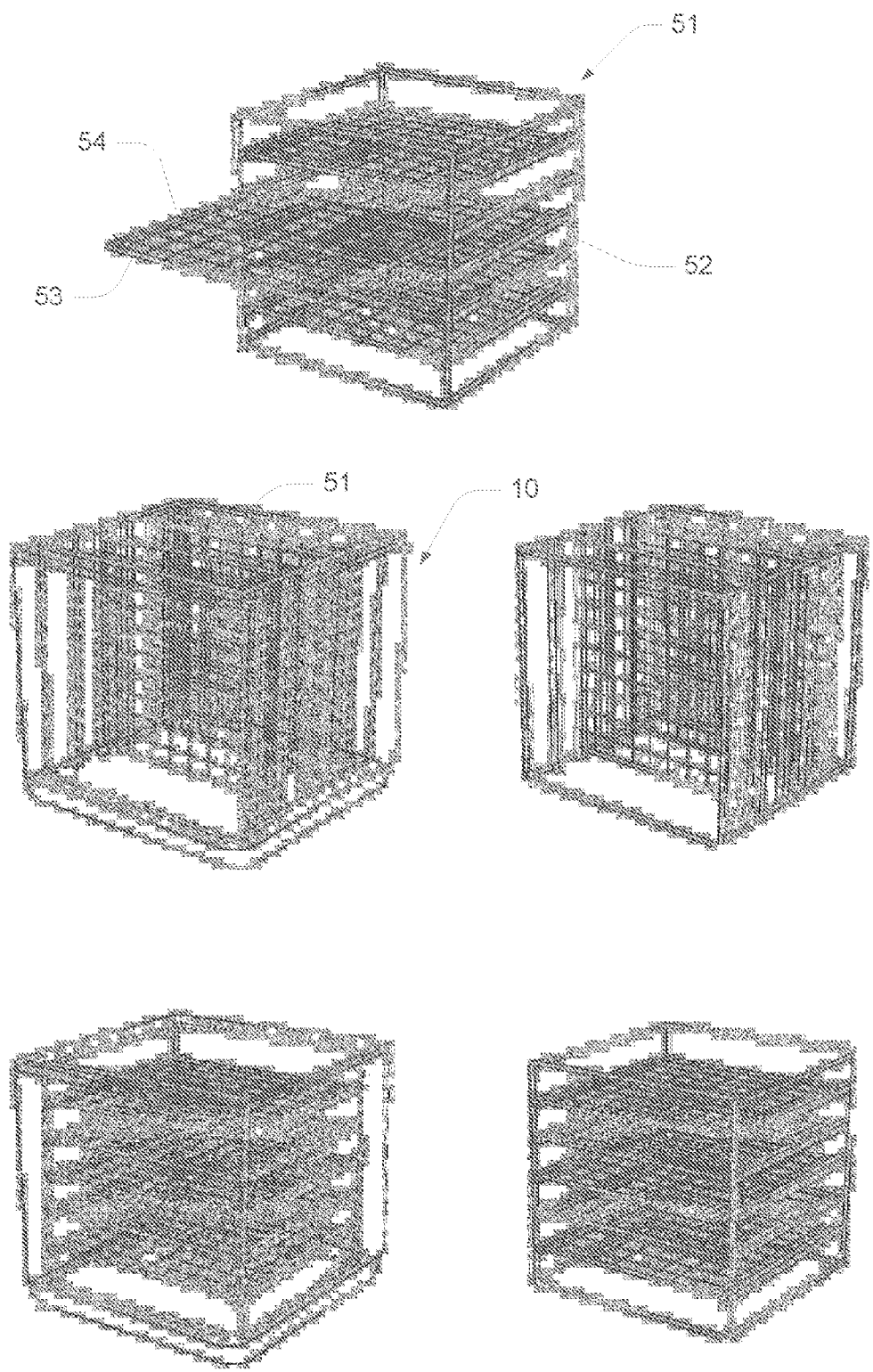
FIG. 5 illustrates, in perspective view, a second rack for a sous vide appliance.

In the example of FIG. 5, the rack 51 comprises of a frame 52 with a removable, parallel shelves 53. Tire racks 47, 51 can be used in a vertical or horizontal orientation. The rectangular shelves made from wire or mesh 54 may be used to support both large and small food items.

Figure 6:
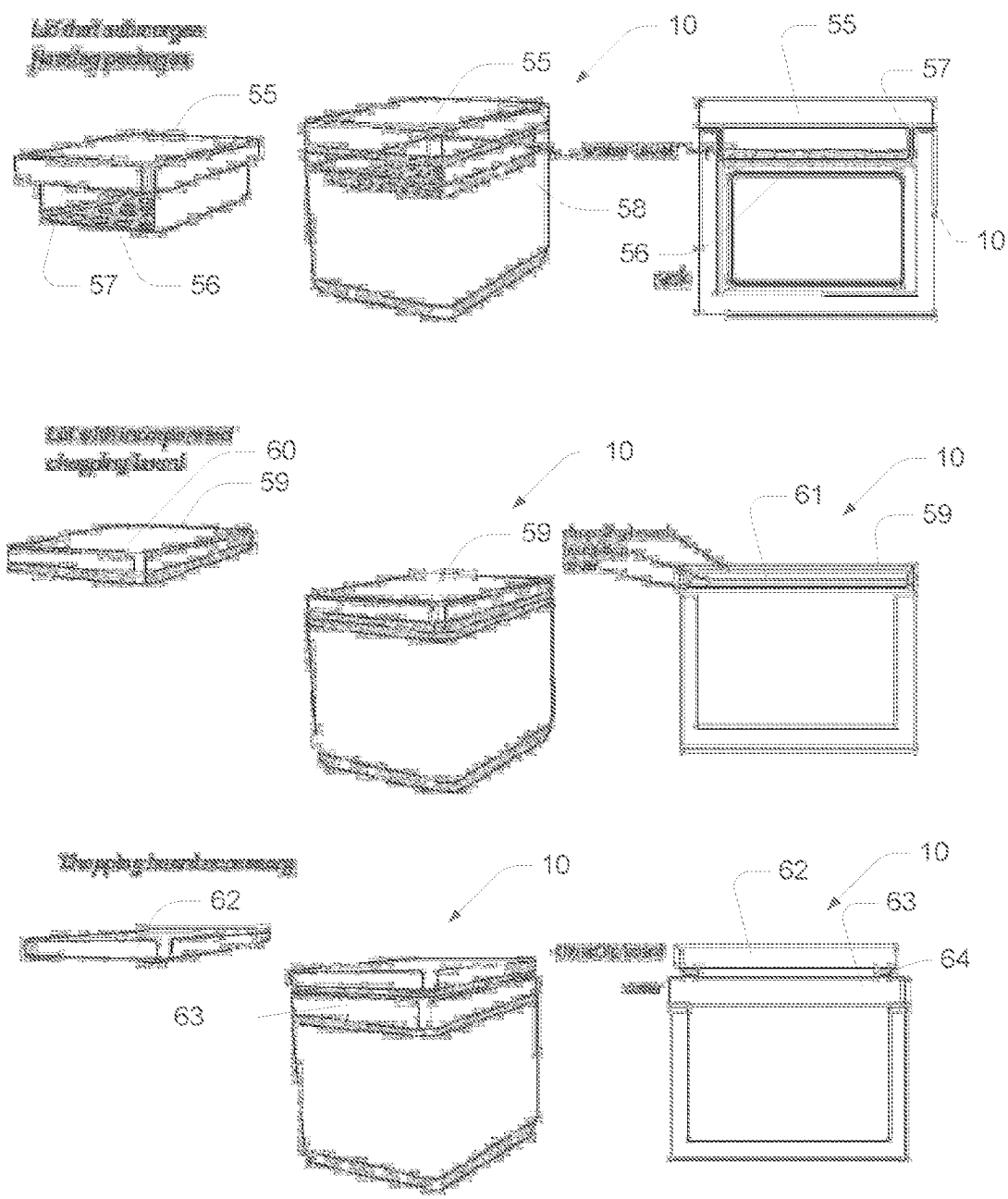
FIG. 6 illustrates in stele and perspective views, different lid arrangement for a sous vide appliance.

As shown in FIG. 6S a sous Vide appliance 10 may be provided with an insulated lid 55 from which is suspended a thin perforated shelf 56. The shelf 56 is spaced apart from the underside of the lid 55 by a pair of opposing sidewalls 57 far enough that the shelf 56 is below the intended water level of the sous vide cooker. In this way, a food item 58 that tends to float will be submerged by the shelf 56 when the lid is in place.

The lid 59 may also incorporate an integral chopping board. 60 as well as an insulating core 61. In the alternative, a chopping board 62 may be provided that is the same size and shape of the lid 53. The chopping board 62 may then be provided with non-slip feet 64, preferably in the 4 corners, so that the chopping board does not slip with respect to the lid 63.

As shown in FIG. 7, a domestic sous vide appliance 10 can be integrated into a kitchen counter top by locating it below the level of the bench top 70. In preferred embodiments, the sous vide cooker 10 can be located next to the and below an existing sink 71. The appliance 10 may be located, on a sliding shelf with a decorative outer panel or be provided, with an integral decorative panel 72 that resembles or otherwise conforms to the design of the cabinet doors adjacent to it. Thus, an under bench, domestic, sous vide cooker 73 will be associated with a drain hose 74 that is isolated from the interior 75 of the appliance by a solenoid controlled valve 76. In this embodiment the hot 77 and cold 78 water inputs are combined in a mixer 79 before entering the interior of the appliance 75 via a solenoid controlled, port 80. The solenoid controlled input and drain ports 76, 80 as well as the mixer 79 may be controlled from the appliances controller 14.

Figure 8:
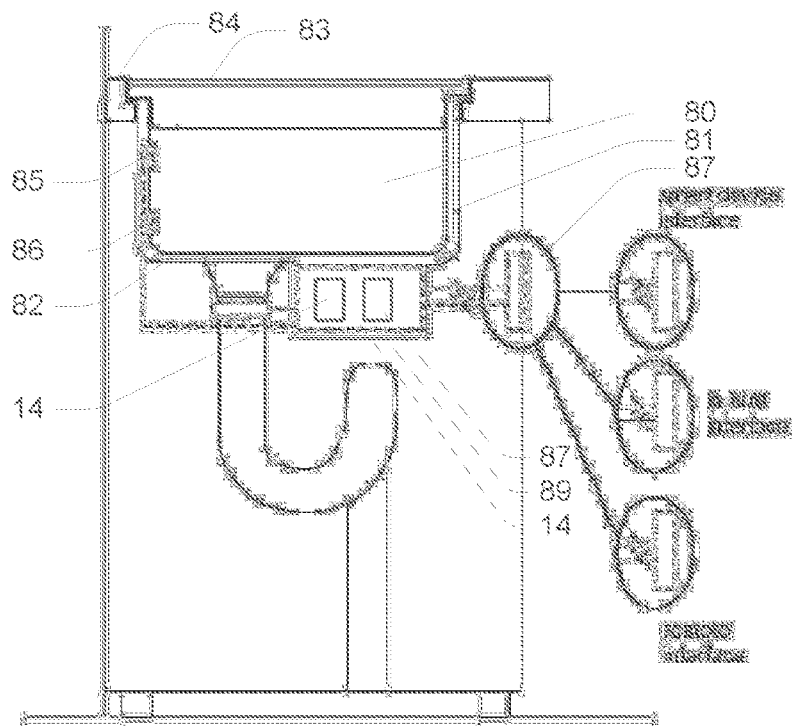
FIG. 8 is a schematic cross section illustrating a sink that is used as a containment or bath in a sous vide appliance.

As shown in FIG. 8, the containment basin 80 of a domestic sous vide appliance 81 may be provided in the form of an insulted sink basin. In this embodiment the basin 82 is insulated and is provided with an insulated lid 83 and is preferable flushed with the surrounding bench comp 84 and that can serve as a chopping board. The basin urn be provided with a liquid level sensor 85 and a temperature sensor such as a thermistor. The device may have an externally mounted user interface 87 that can be accessed directly by the user or serve as a wireless interface to a portable or handheld device operated by the user. In some embodiments the controller 14 may be contained together with a circulation or recirculation pump 88 in a compartment 89 attached and located under the basin.

Figure 9:
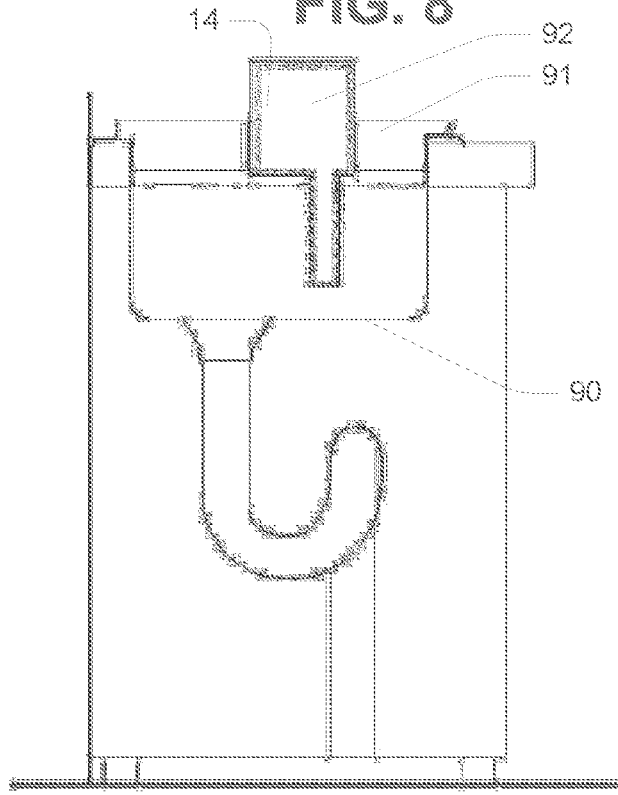
FIG. 9 is a second embodiment of a sink that may be used, as a bath in a sous vide appliance.

As shown in FIG. 9, a sink or insulated sink 90 may be provided with an insulated lid 91 that incorporates a housing for an electric recirculation pump 92, its motor, the controller 14 and other components that may be required in a sous vide cooker are part from the containment compartment for holding the water.

Figure 10:
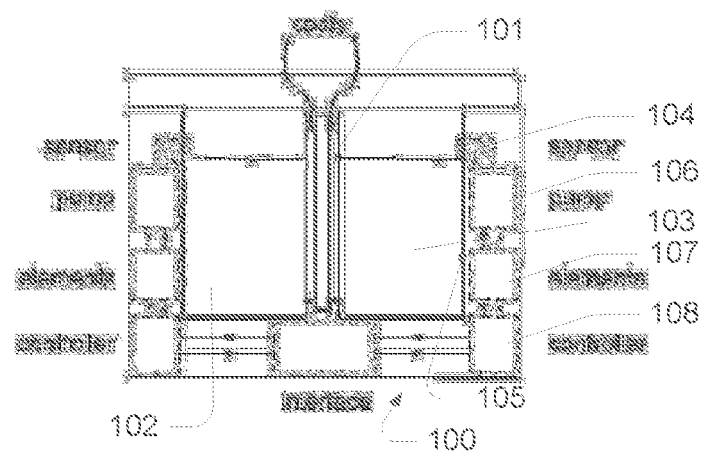
FIG. 10 is a schematic cross section of a sous vide appliance having separate internal compartments.

As shown in FIG. 10, a sous vide cooker 100 may be provided with an internal divider 101, preferably an insulated divider 101 that seals adjacent compartments 102, 103 from one another. Each compartment 102, 103 may have its own water level sensor 104, temperature sensor 105, pump or recirculation pump 106, controllable heating element 107 and controller {if required} 108. A single controller can operate the two compartments 102, 103 separately. This allows two different foods to be prepared at two different temperatures. In preferred embodiments, the divider 101 can be removed, to make a single, larger cavity. In some embodiments, the location of the divider may be adjustable.

Figure 11:
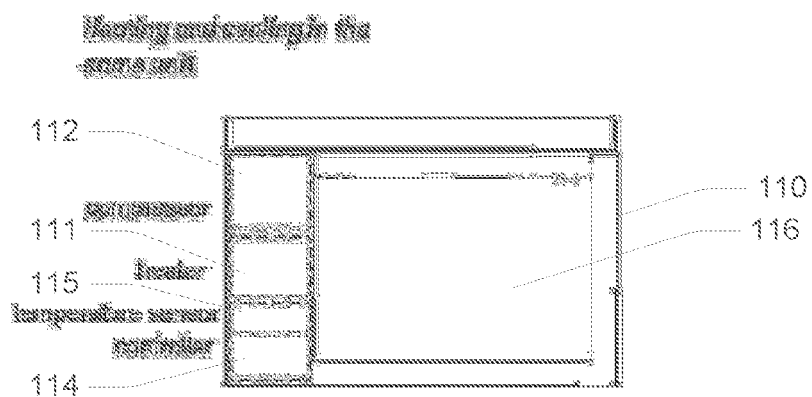
FIG. 11 is a schematic cross section illustrating a sous vide appliance having both heating and cooling capabilities.

As shown in FIG. 11, a sous vide cooker 110 may have a heater or heating elements in and a refrigeration compressor 112. This arrangement would provide a temperature sensor 115 and controller 14 that were able to both heat and cool the contents 116 of the appliance 110.

Figure 12:
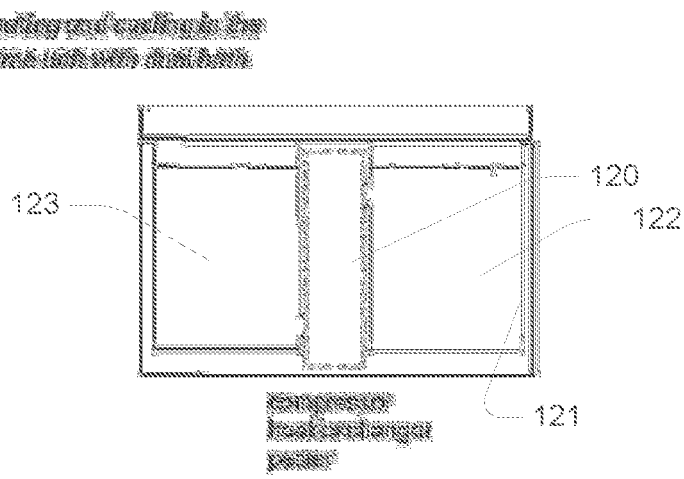
FIG. 12 is a schematic cross section illustrating a sous vide appliance having both, a hot and a cold bath.

As shown in FIG. 12, a Peltier cell 120 may be used to subdivide the internal compartment 121 in to a hot side 122 and a cold side 123.

Figure 13:
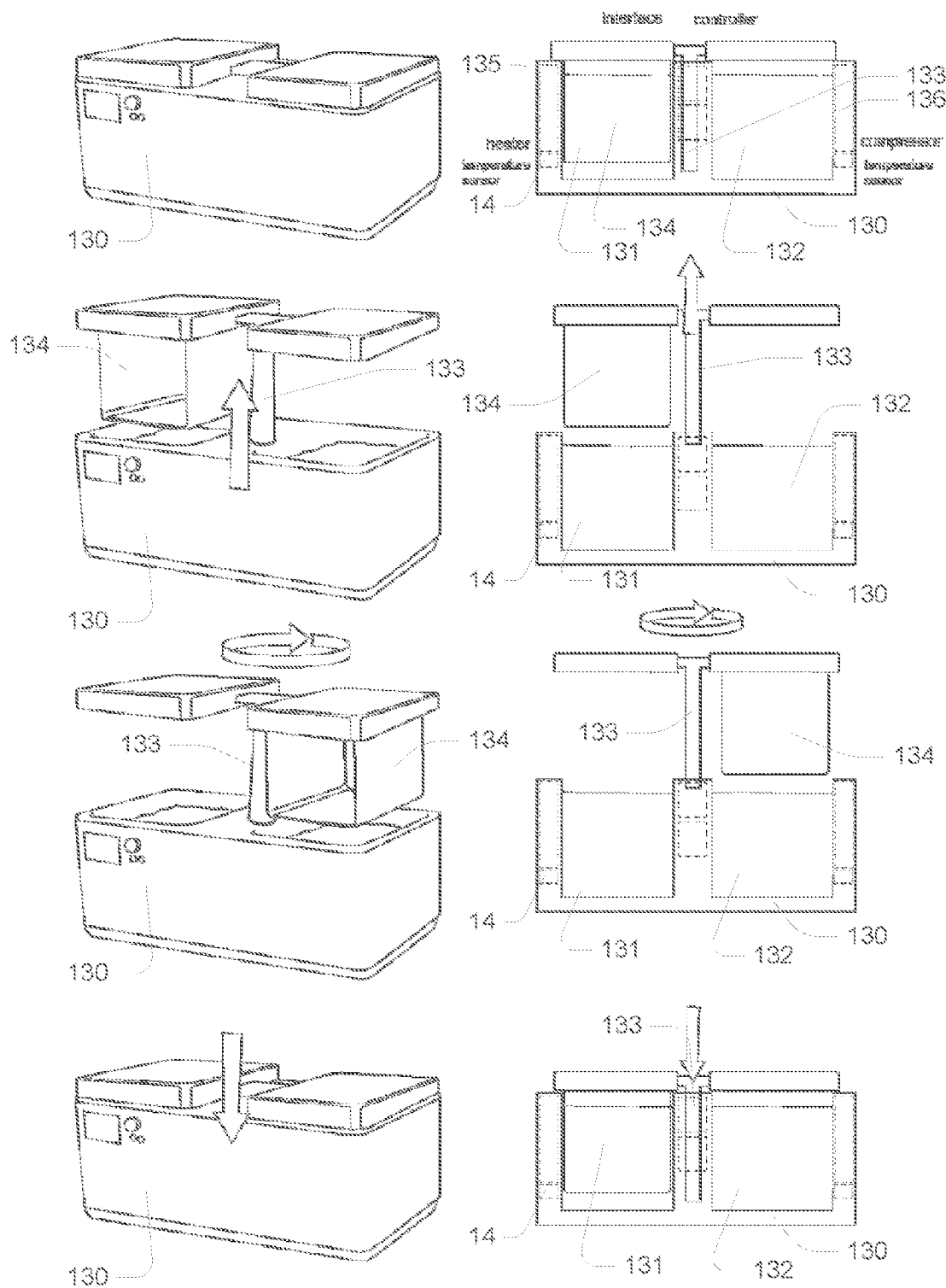
FIG. 13 illustrates in schematic and perspective views a sous vide appliance with two separate baths and a food lifting mechanism.

As shown in FIG. 13, a sous vide appliance 130 may be provided with adjacent compartments 131, 132 having between them a motorized, nematic or hydraulic jack or lifter 133. The lifter 133 is able to support one or two holders 134 adapted to hold vacuumed bagged food, for example, racks as suggested by FIG. 4 and FIG. 5. Under the control of the controller 14 the lifter 133 can rise high enough that the holder 134 is removed from the water bath and can descend, slowly enough to then submerge the holder 34 in the water bath. In some embodiments one compartment 131 of the appliances provided with a heating elements 135 and the other side 132 is provided with refrigeration coils, Peltier cell or other form of refrigeration 136. This allows one compartment 132 to be refrigerated or chilled while the other compartment 131 is heated to cook foods. This arrangement allows a number of different operations to be performed. A unit such as the one depicted in FIG. 13 can lower the liner 133 at a user specified time and remove it from the water bath as a second user specified time. It can rotate the lifter 133 so that the position of the first and second, holders is reversed. It can also cook a food item on one side, then lift it then submerge it on the refrigerated side.

Figure 14:
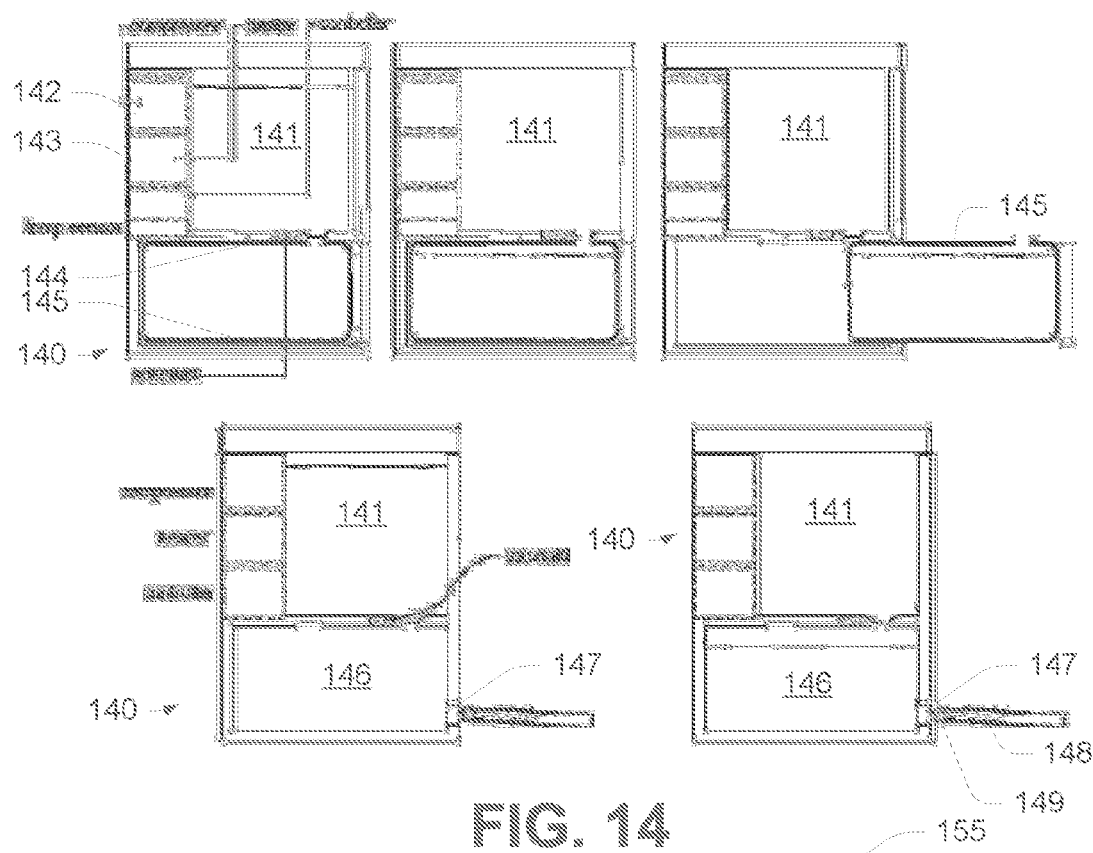
FIG. 14 illustrates in schematic cross sections a sous vide appliance with a removable or separate holding tank.

As shown in FIG. 14, a sous vide appliance 140 may have an internal bath 141 that is associated with both a refrigeration device such as a compressor 142 and heating elements 143. The floor of the bath 141 features a solenoid activated valve 144 that can drain the contents of the bath 141 into a removable internal compartment 145. This allows the contents of the bath 141 to be selectively drained into the internal compartment that lies below it. By removing the hot water around the food in the bath. 141, the temperature is reduced allowing foods to be mote rapidly brought to room temperature if the user is not available to remove the food form the bath 141. As an alternative to a removable internal compartment 145, the appliance 140 can have an internal compartment 146 that can be filled, then, having its own drain 147, be emptied using a drain hose 148, access to which may be controlled by a solenoid or other operated valve 149.

Figure 15:
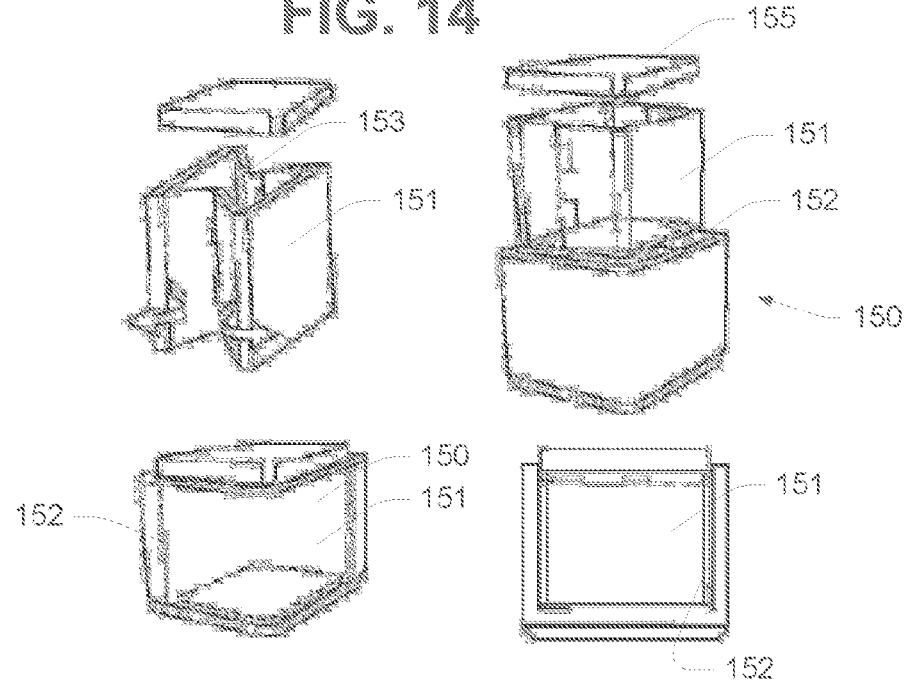
FIG. 15 illustrates in perspective and cross sectional views a sous vide appliance having a removable chiller.

As shown in FIG. 15 a sous vide appliance 150 may be provided with an internal chiller 151. The chiller 151 is shaped and sized to conform to the internal sidewalls of the containment basin 152. The chiller 151 may be used in conjunction with fresh or cold, water after a cooking operation has finished, and before foods are stored in a refrigerator or freezer. In this example, the height of the chiller 151 corresponds to the height of the internal cavity 152. In this example, the chiller has apposing and hinged, side walls 153 that may be folded towards each other to allow the chiller to be stored flat and layers expanded to fit under the lid. 155 and within the internal compartment 152.

Figure 16:
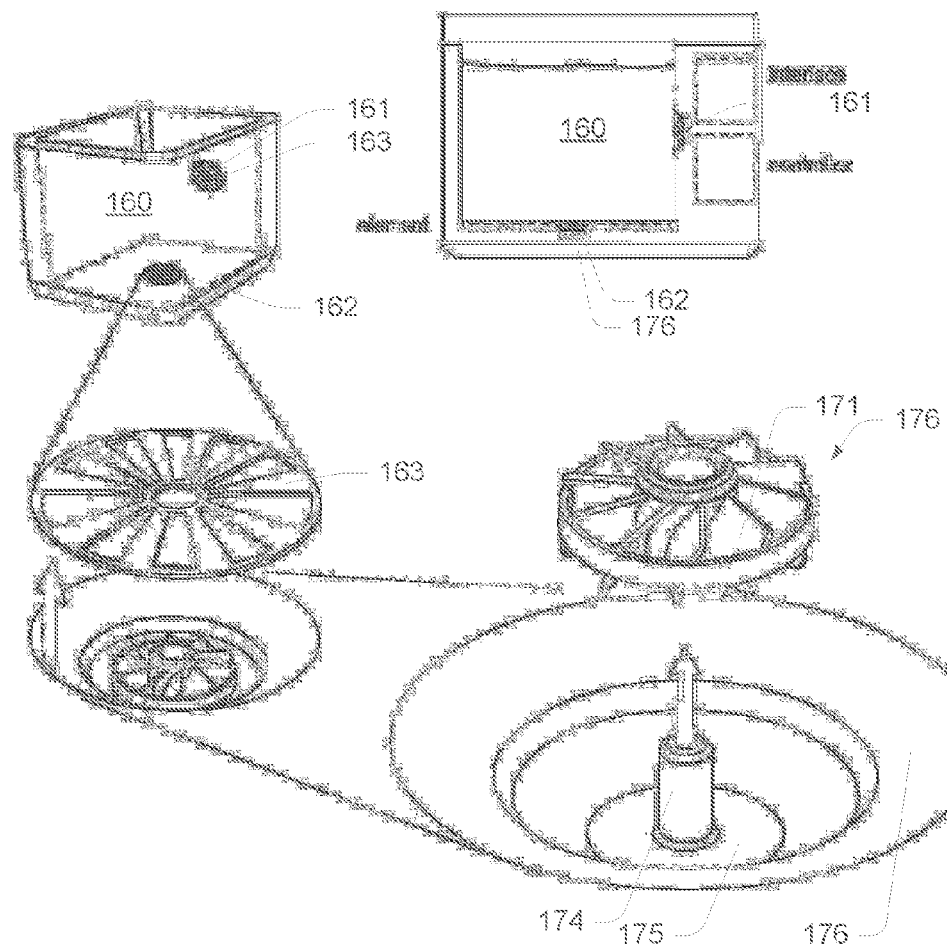
FIG. 16 illustrates in perspective and schematic cross section, a sous vide appliance having a removable and submerged impeller.
Figure 17:
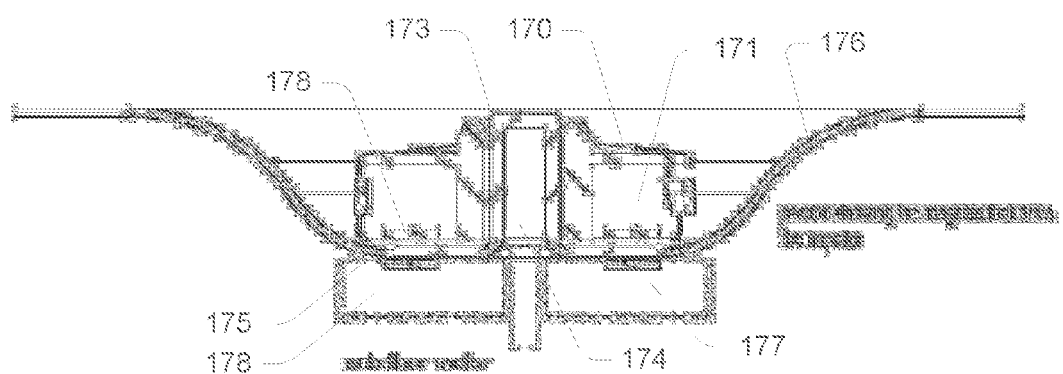
FIG. 17 is a cross section of the impeller suggested, by FIG. 16.

As shown in FIG. 16 and FIG. 17, the sous vide appliance's internal cavity 160 may be provided with one or more submersible impellers 161, 162. In order to not occupy usable cooking space in the cavity 160, the impellers may be recessed or hushed with the interior of the compartment 160 and impellers 161 may be located on a sidewall. Impeller 162 may also be located on tire floor of the compartment 160. An impeller may be covered with a protective grating 163. As shown in FIG. 17, the impeller 170 has one or more fins 171 for moving the water in the compartment 160 and therefore achieving a more even temperature distribution in the body of cooking water. The impeller 170 has an internal bore 173 for receiving a stub shaft 174 affixed to the floor 175 of a recessed 176 in the compartment 160. The impeller 170 rotates about the stub shaft 174 under the influence of a motor 176 located below the floor 175. The motor carries magnets 177. The magnets drive secondary magnets 178 carried by the impeller.

It will be appreciated that, in an example embodiment, a removable submersed impeller-sits below floor and/or wall level, and by be mounted on the floor and/or the wall of the cavity to facilitate water movement and therefore a more even, temperature in the body of water.

Figure 18:
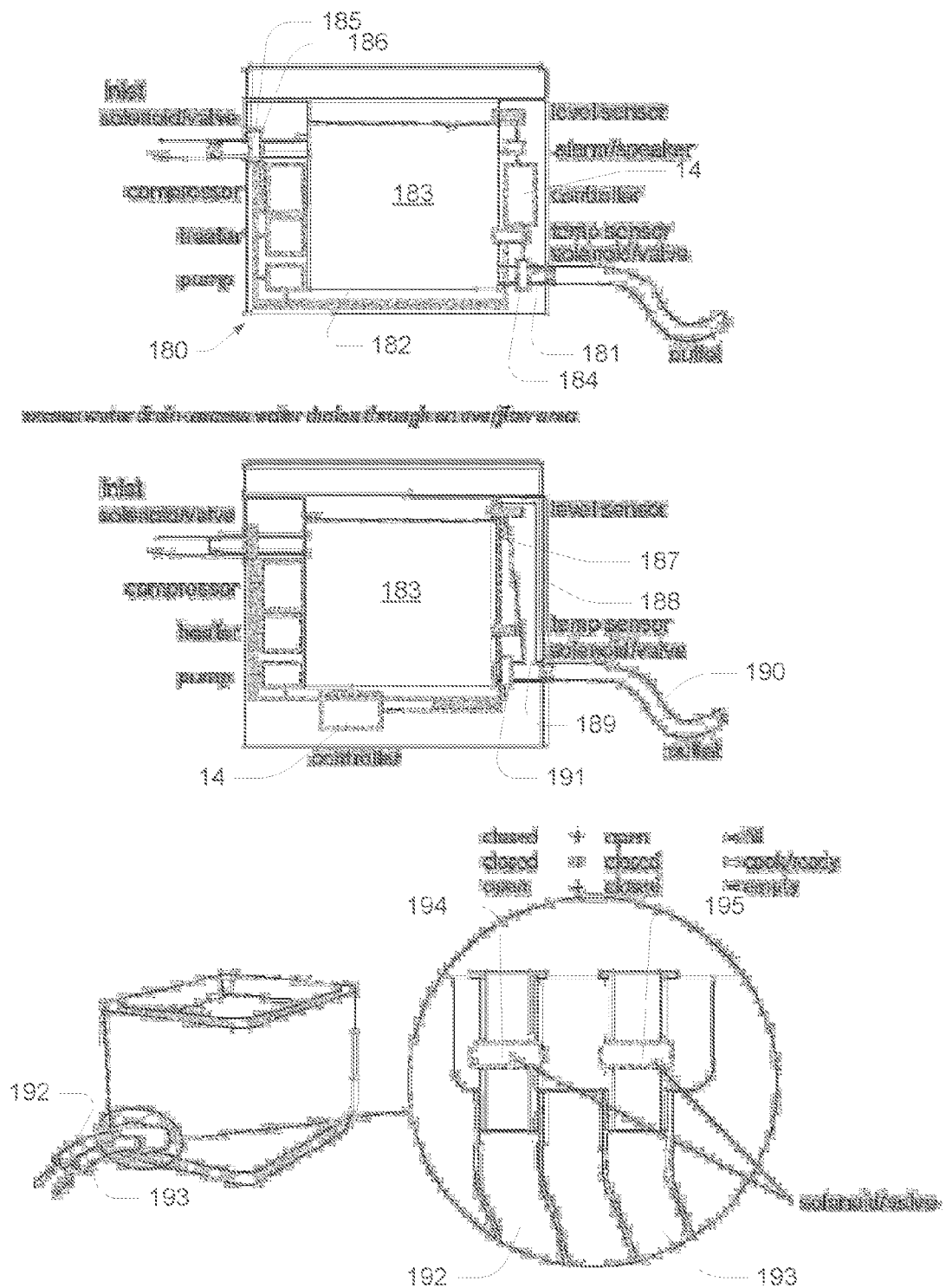
FIG. 18 illustrates in schematic cross section and perspective views a sous vide appliance with solenoid controlled inlet and drain valves.

As shown in FIG. 18, the ease of filling and draining a sous vide appliance 180 is facilitated, by providing a drain 181 at the lowest extent 182 of the cooking compartment 183, that opens and closes using a electronically controllable solenoid valve 184. A water inlet 185 located towards the top of the compartment 183 also features an electronically controllable solenoid valve 186. The inlet and outlet solenoid valves 184, 186, are opened and closed by the controller 14. In another example, excess water in the compartment 183 flows over the top of the internal wall or weir 187. The weir 187 is located within the housing 188. Water discharged over the top lip of the weir 187 is collected in a drain area 189 discharged from, the drain area through an outlet hose 190 is controlled by a solenoid valve 191 that is operated by the controller 14. In some embodiments, the water fills and drain hoses 192, 193 are located in close proximity to one another and both are controlled independently, from the controller 14 using solenoid valves 194, 195.

Figure 19:
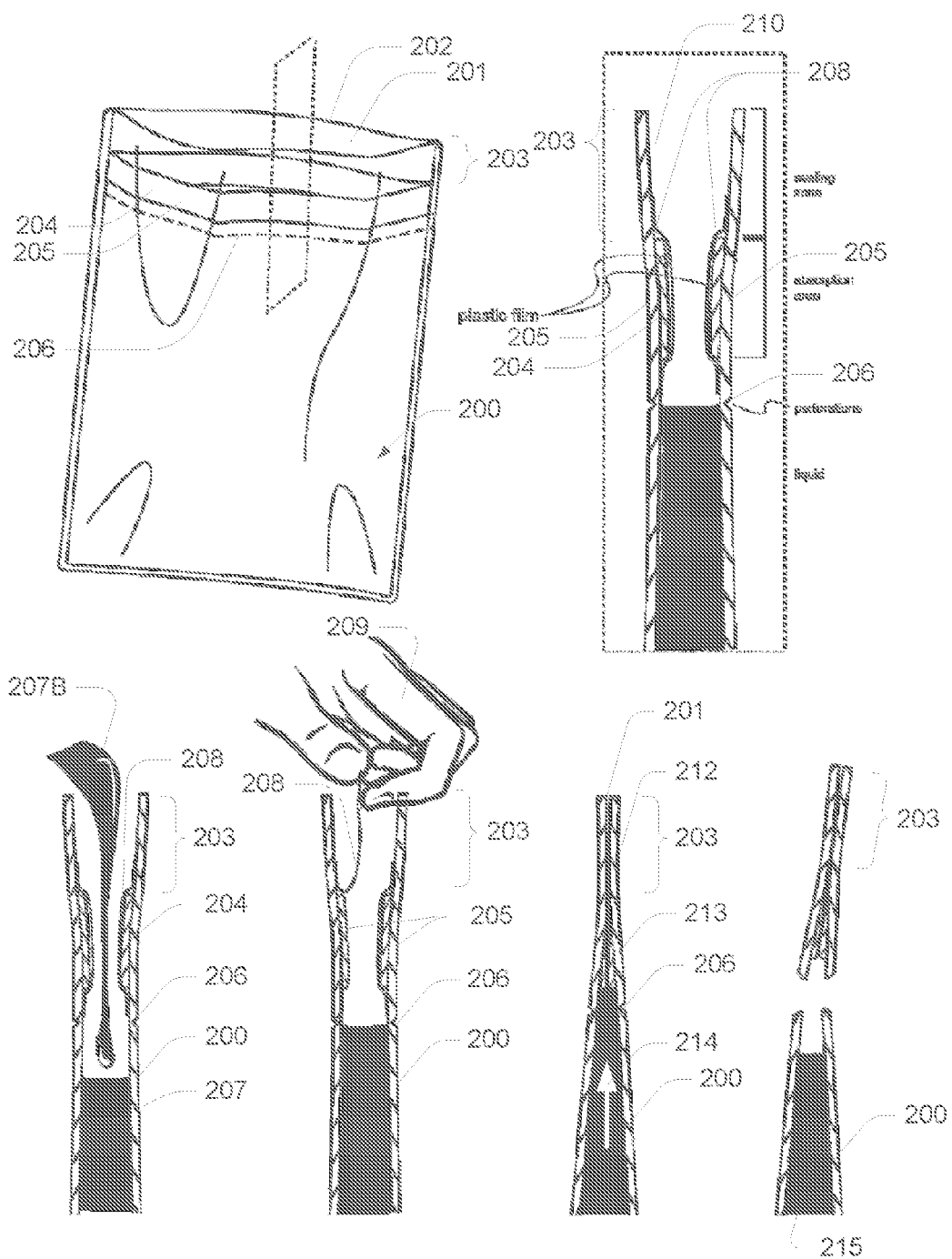
FIG. 19 illustrates in perspective and cross sectional views a bag for a sous vide appliance.

As shown in FIG. 19, a plastic bag 200 has a mouth opening 201 defined by the upper edges 202 of the bag. Heat scalable bags are well known in sous vide cooking. Particularly where the interior of the bag is exposed to the vacuum, there is a tendency for liquids associated, with food in the bag to be expelled into the heat seal zone 203, these liquids in the zone 203 having the propensity to interfere with the heating sealing process. In order to prevent such liquids form, interfering with the heat sealing process, a bag is provided with an internal moisture barrier 204. The barrier 204 comprises an internal circumferential band of absorbent material such as synthetic textile or absorbent paper 205. In preferred embodiments, the absorbent barrier 205 is located between the heat sealing zone 203 and perforations or tearable zone 206 that allow the bag to be easily opened after the cooking process is completed. As show in FIG. 19 a bag 200 is loaded with a food for cooking 207 that may have a liquid content. In order that the absorbent barrier 204 to be initially protected from, the incoming or outgoing liquid (overflow) 207B, the absorbent barrier 204 is initially and entirely protected by a plastic film 208. After the bag is filled but before the edges are sealed, a user 209 can peal away the plastic film 208 by disrupting the edges 210 of the film 208 that are adhered to the interior of the bag 200. With the plastic film 208 removed, the interior surfaces of the bag adjacent to the mouth opening 201 are brought together 212. This action also brings together 213 the exposed faces of the absorbent barrier 204. Liquids attempting to exit the bag 214 encounter and are absorbed by the absorbent barrier 204 before they reach the heat seal area 203. After the bag is heat sealed and the contents are cooked, the top of the bag can removed, by tearing or cutting through the frangible portion, scoring or perforations 206 to expose the internal contents 215 of the bag 200.

In an embodiment, by way of example only, a bag can include a liquid absorbent material designed to stop the liquid from interfering with the sealing area. A plastic film protects this absorbent material while the bag is being loaded with the food and liquid. This film is removed just prior to sealing the bag. A perforated area is also provided to make the opening of the bag more easily.

Figure 20:
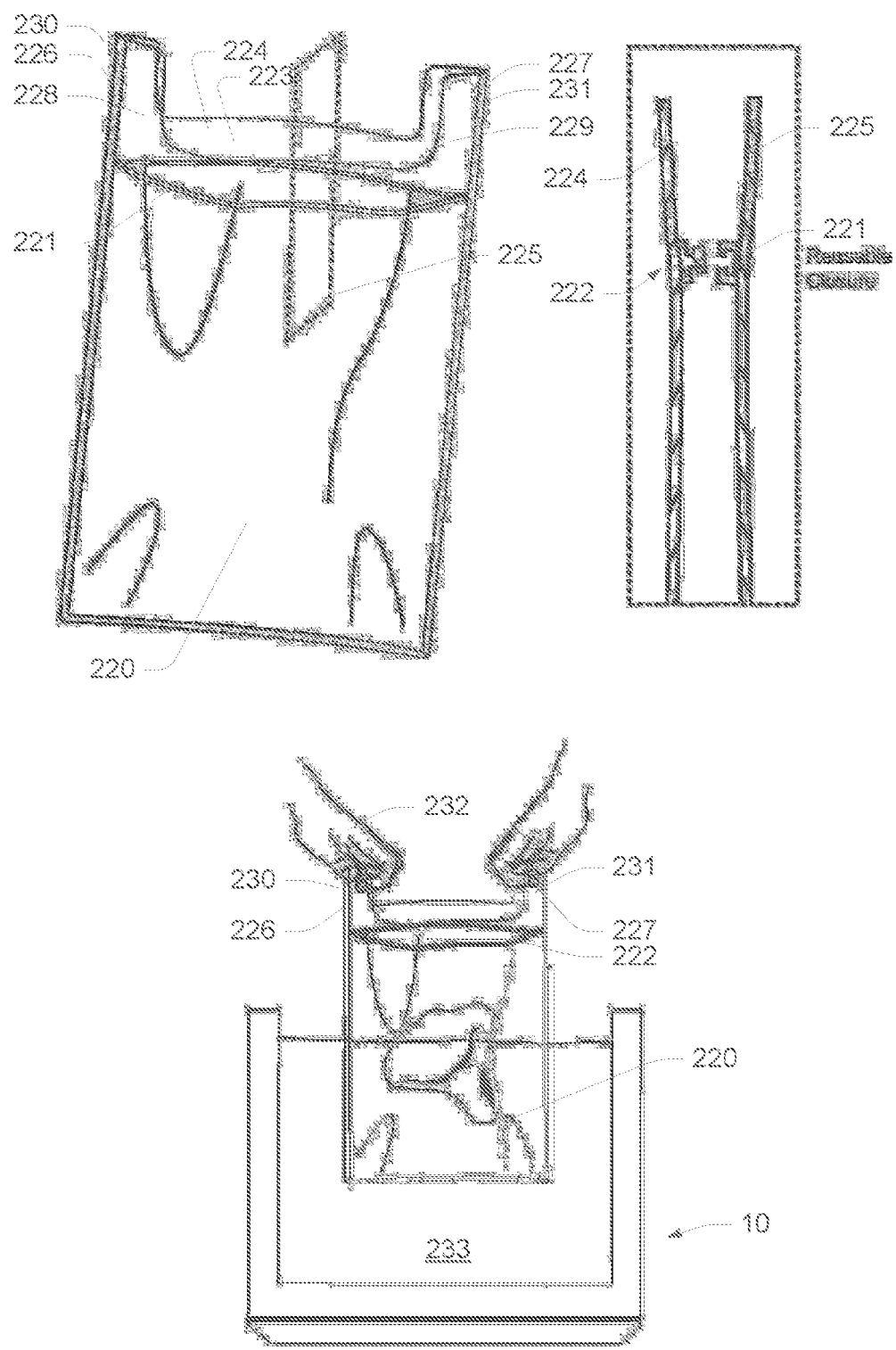
FIG. 20 illustrates in perspective and cross sectional views another bag for a sous vide appliance.

As shown in FIG. 20, a plastic bag for sous vide cooking 220 may have a reusable closure 221 comprising interlocking components 222 that seal the mouth opening 223 when they are joined together. The elements 222 may be released from one another after cooking so that the bag can be reused. In this example, the bag structure comprises identically shaped from and back sheets 224, 225, along the exterior edges 226, 227 and above the closure 221, a pair of lateral ears 228, 229 that are joined to form a pair of opposing handles 230, 231 a user 232 may grasp the ears 230, 231 for the purpose of lowering the bag 220 into the sous vide appliance to remove air 10 and later removing the bag from the internal compartment 233 for sealing.

Figure 21:
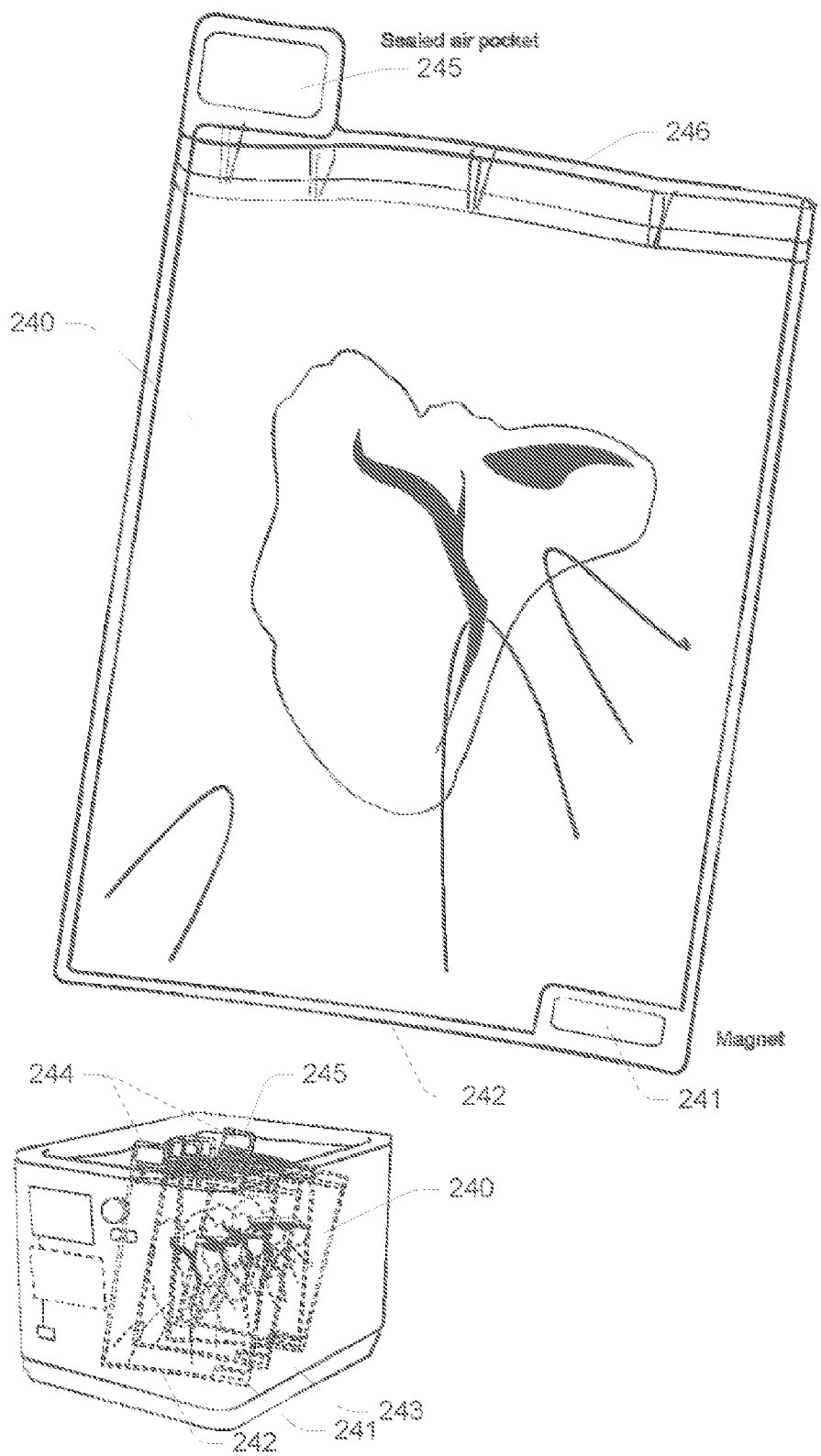
FIG. 21 is a perspective view of a bag for a sous vide cooker having a magnet and a float.

As shown, in FIG. 21, a bag 244 sous vide cooking may have a removable or built-in magnet 243 preferably located along a lower edge 242 of the bag 240. The magnet is attracted to steel or another magnet located on, in or under the internal floor 243 of the internal cooking compartment. This removable and stably locates the lower edge of the bag and promotes consistent spacing between different bags 244 located in the internal compartment. In order to keep the bags more upright, bags may be provided with a sealed air pocket 245, preferably located on or adjacent to an upper edge 246 of a bag. In this example, this sealed, air pocket 245 extends above the upper margin 246 of the bag 240. The sealed air pocket 245 urges the upper edge 246 toward, or above the upper most water level in the compartment.

Figure 22:
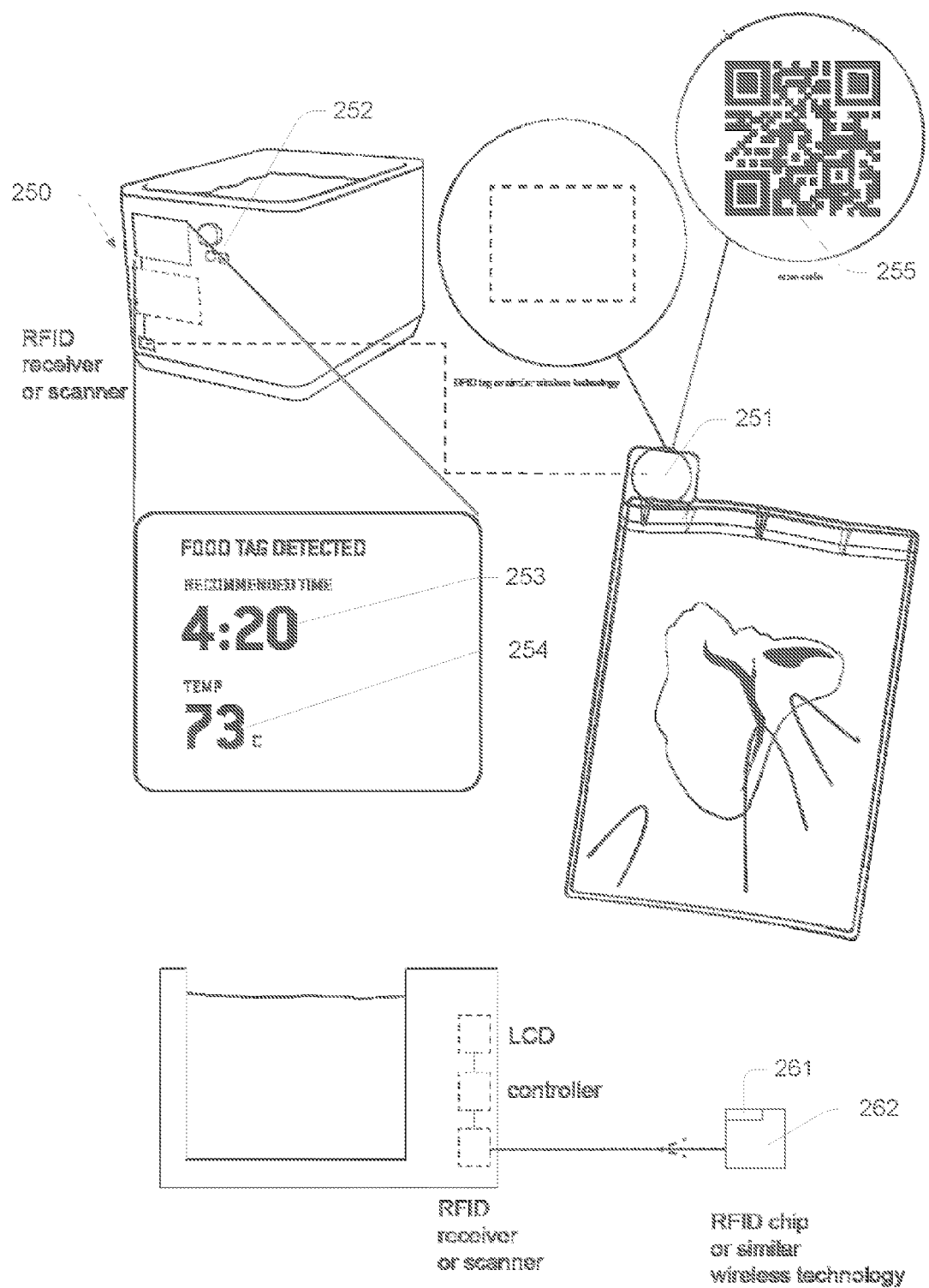
FIG. 22 illustrates the use RFID and barcode technology (or the like) in a sous vide appliance.

As shown in FIG. 22, an individual bag and its content may be identified to a sous vide appliance 250 by providing the bag with an RFID tag 251, bar code or other means of remote identification. The sous vide appliance 250 is equipped with means for reading the tag 231 such as an RFID receiver or bar code scanner. The devices interface 252 displays, for a particular identified bag and its tag 251, information such as a recommended cooking time 253 and they suggested cooking temperature 254. Electronic scales associated with the appliance 250 may have an integral label printer for creating a barcode such as a 2D barcode 255. The barcode may be encoded with, information regarding the weight determined by the scales and the size, shape and content of the bag as input into the scales through a user interface 260 located on or associated with the scales 262. Barcodes may also be used by third party food providers to encode Internet links, data, cooking instructions or etc.

As shown in FIG. 23, a bag 270 for sous vide cooking may incorporate a built-in, disposable or reusable temperature probe 271 such as a Thermistor. The probe 271 is, this example, is associated with a wireless transponder, for example an RFID tag 272. A sous vide appliance 273 may incorporate a receiver 274 for receiving a temperature signal indicative from the transponder 272 and communicating with the appliances controller 14. When the temperature signal and elapsed time are determined by the controller to be sufficient, a notice or alarm 275 may be displayed on the graphic interface 276 accompanied by a second alarm such as a flashing light 277 or audible alarm. Where the temperature probe 271 is reusable, it is preferably permanently fixed to the transponder 272 where upon the electrical connection that connects the probe 271 to the transponder 272 is inserted past or through the bag's seal area 281. The transponder 272 may be providing with an integral air pocket or float 282. The transponder 272 may be inserted at the time of third party food packaging and then disposed of by the user.

As shown in FIG. 24, a bag may also be provided with a temperature probe such as a Thermistor 291 that electronically communicates 292 with, a visual temperature indicator 293. The probe 291 [similar to the probe 271 in FIG. 23] may be incorporated into the bag structure or extend inwardly from the interior of the bag so that the probe may be inserted into a food article. The thermal indicator may be in the form a display 294 that indicates, either electronically or by the activation of liquid crystals, a degree of food doneness 295, for example using a thermal metric liquid crystal strip 296 associated with corresponding descriptors 297 such as "rare, med-rare, medium, med-well and well done". The temperature probe 291 may be connected to the indicator 293, 294 by a thermally conductive wire or strip 299.

Figure 25:
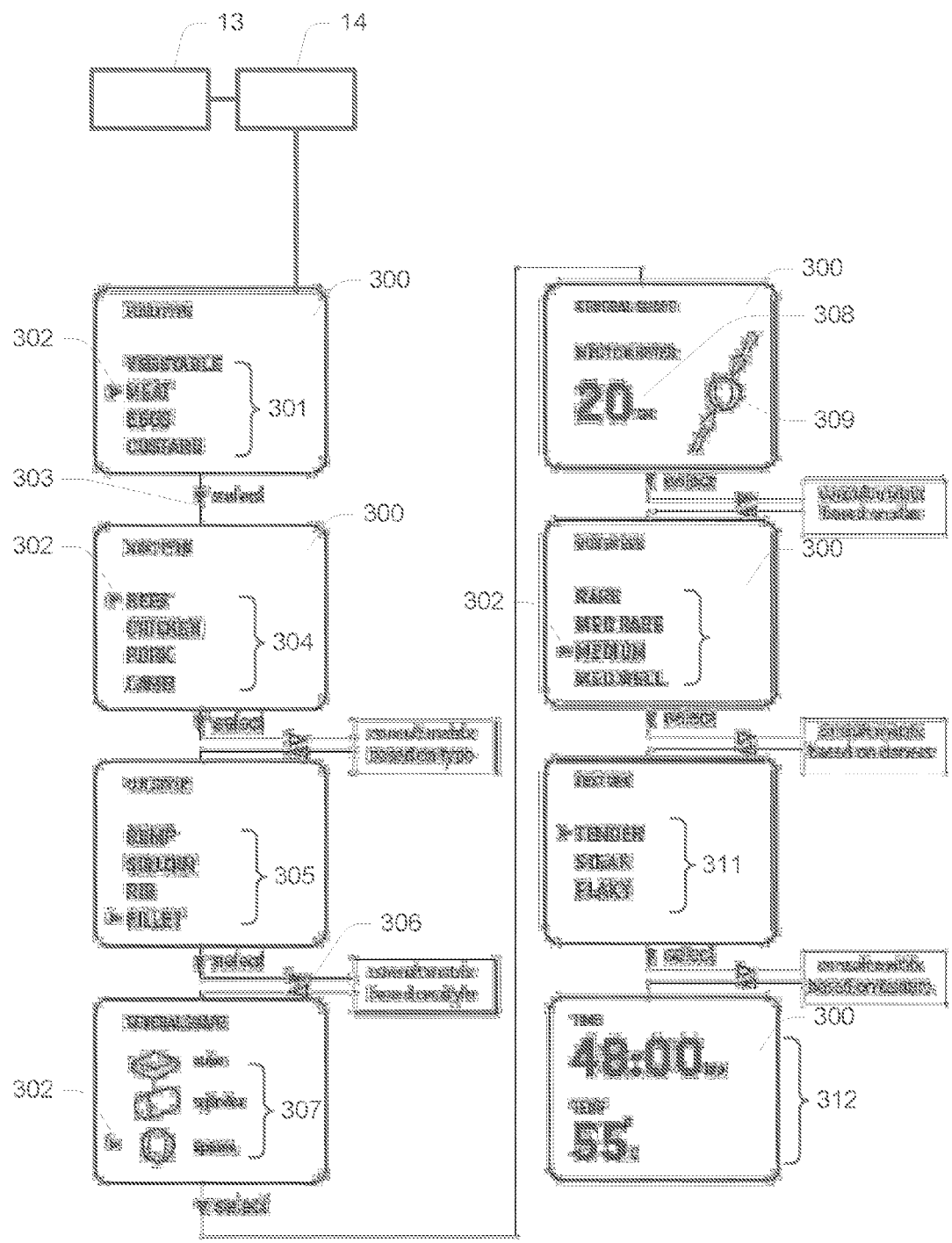
FIG. 25 is a flow chart illustrating the display of a sous vide appliance during user programming that is prompted by the units controller.

As shown, in FIG. 25, a graphic user interface to a sous vide appliance 300, in conjunction with the appliance's controller 14 may be used to assist a user by suggesting the most appropriate time and temperature based on one or more inputs received from the user interface 13. For example, a display 300 provides a list of food types 301. A user scrolls through the food types until the cursor 302 is adjacent to the user's selection. The user then makes the selection 303. The display 300 then depicts a list or array of meat types 304 based on the prior selection of meat. The user scrolls through the meat type list 304 using the cursor 302 and makes a selection, in this example, "beef". The controller 14 utilizes the data from a matrix or lock up table based on the user's selection and displays another list of beef types 305. A user selection 306 from this list generates a display suggesting approximate or overall shapes 307 such as cube, cylinder or "sphere". The user is then prompted to input one or more parameters relating to the shape. In this example, the user has positioned the cursor 302 adjacent to "sphere" where upon the user is prompted to input a diameter. The user inputs a diameter and the display 300 depicts the diameter input 308 from the user. The display may also provide a visual clue 309 to the parameter or measurement that is required from the user. The display 300 then provides a list of degree of cooking or doneness from, winch the user may select a value using the cursor 302 and a selection input 13. The user is then prompted enter a degree of texture from a list of suggested textures 311. Finally, the controller 14 utilizes the various data inputs from the aforementioned selection process [food type, meat type, cut style, general shape, shape parameter, doneness, and texture] to determine from an algorithm, matrix or look up table a selected, cooking time and temperature. These values 312 are displayed on the interface's display 300. The user may modify the suggested value 312 prior to imitating a cooking operation in the appliance 10. It will be understood that the aforementioned, process of acquiring may be performed in a different order or in accordance with different parameters, the aforementioned being merely an example of the utilization of the controller 14 and the display 300 in the acquisition of data and user preferences regarding the food to be cooked.

Figure 26:
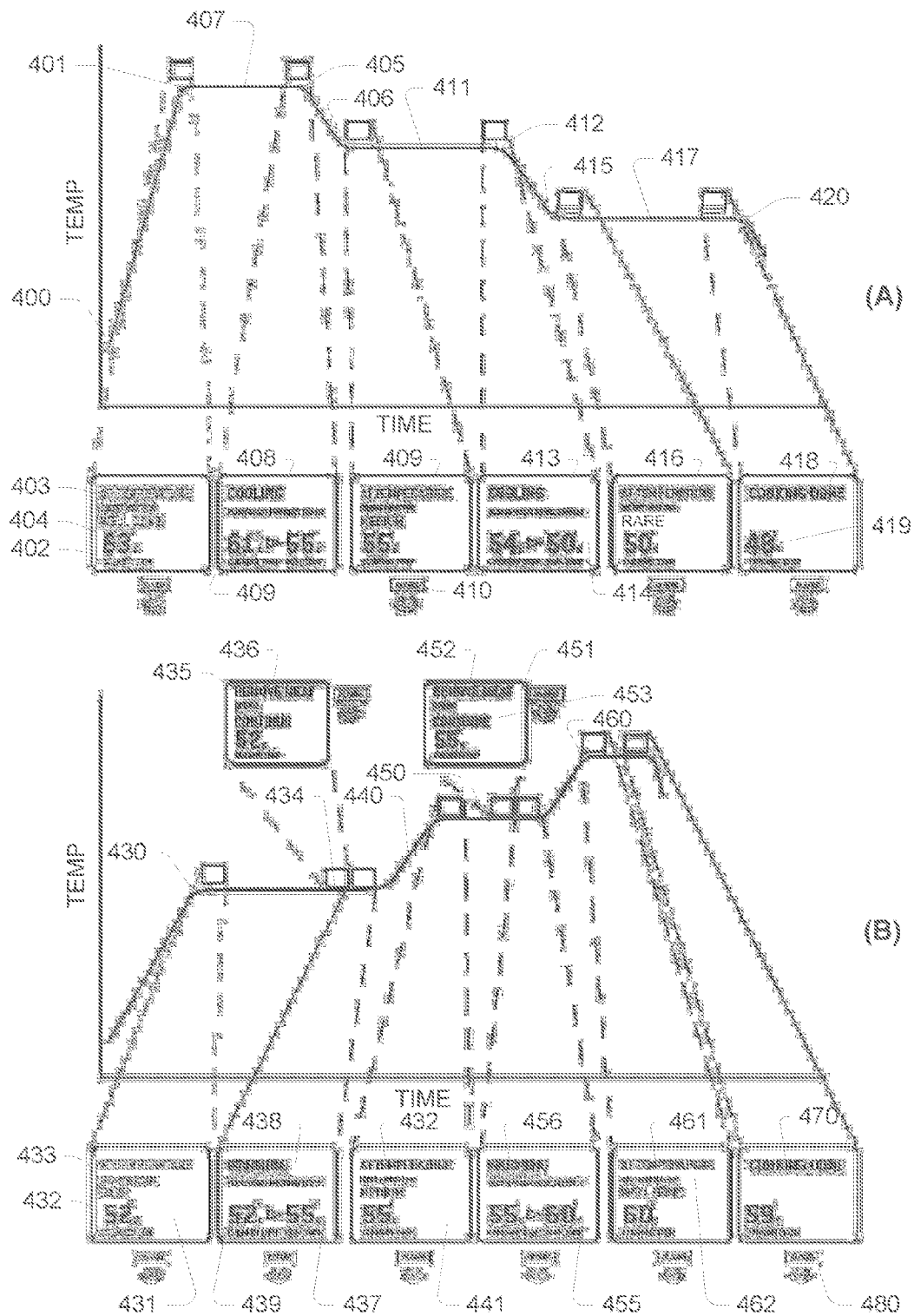
FIG. 26 illustrates two different cooking programs executed by the controller of a sous vide appliance, one illustrating decreasing cooking temperature over time and the other illustrating increasing cooking temperature over time.

As suggested by FIG. 26A, a sous vide appliance 10 can cook multiple food items to different levels of doneness by using the controller 14 to vary the temperature of the water bath in accordance with user preference or data input by the user into the device's user interface. In the examples of FIG. 26, three pieces of meat in three separate bags are cooked to different levels of doneness and are allowed to finish simultaneously. As illustrated in graph A the water bath begins at an ambient temperature 400. Using the user interface 13, the user indicates that three pieces of meat will be cooked, at each of the following levels of doneness: well done, medium and rare. The controller 14 causes the temperature of the water bath to rise to a maximum cooking temperature for the particular well done meat. The display 402 provides instruction to the user 403 to insert the bag containing the meat for well done cooking and also displays the current temperature 404. The microprocessor determines when in time 405 the temperature of the bath will be reduced to a second cooking temperature 406. At the end of the first cooking interval 407 the display 408 indicates that the water bath is cooling and asks the user to wait until the next cooking phase. The display also indicates 409 the current temperature and the second temperature target. When the second target temperature has been reached 406 the display 409 indicates that the second target temperature has been reached and displays the current temperature. An audible alarm 410 may sound, alerting the user to insert the second bag into the bath. The controller then initiates a second cooking interval at a lower temperature than the first. The second interval 411 then terminates 412 and the display 413 indicates a second cooling interval and displays an instruction to the user to wait for the inception of the next phase. The display also indicates the current cooking temperature and the third target temperature 413. At the end of the second cooling interval 415 the display 416 indicates the current temperature and an instruction for the user to insert the third bag for meat done rare. At the end of the third cooking interval 417 the display 418 indicates that all three portions of food are done. The current temperature may also be displayed 419. In the aforementioned example, the three bags are placed into the water bath successfully and without removing any of the bags until the end 420 of the cooking cycle. At the end of the cooking cycle 420 all three bags are removed from the water bath, or the bath bay be chilled in place.

FIG. 26B illustrates a second and faster example of a cooking cycle in which all bags are inserted at the start and temperature is gradually increased rather than decreased. Bags are removed from, the bath as they finish cooking. As shown in graph B, the controller causes the bath temperature to rise a first cooking temperature 430. The display 431 indicates the current temperature 432 and an instruction 433 for the user to insert all three bags of this example. At the end of the first cooking interval 434 the display 433 provides the user with an instruction 436 to remove the first bag. The display also indicates the current temperature. Thereafter, the display 437 indicates that the water bath is warming 438 and indicates both the current temperature and the second, target temperature 439. At the end of the second, warming interval 440, the display 441 provides the user with an indication 432 that the second bag is cooking the meat to a doneness of e.g. medium. At the end of the second cooking interval 450 the display 451 provides the user with an instruction 452 to remove the meat and press a "continue" button on the user interface 453. Pressing the "continue" button prompts the display 455 to indicate 456 that the bath is warming. The display also shows the current and third target temperature. At the beginning of the third cooking interval 460, the display 461 provides the user with an indication 462 that the third bag is cooking meat to a doneness of well done. The current temperature may also be displayed. At the end of mini interval, the display 470 indicates that the cooking process is completed and that the user should remove the last bag from the water. All of the aforementioned steps may be accompanied by audible or visual alarms 480.

Figure 27:
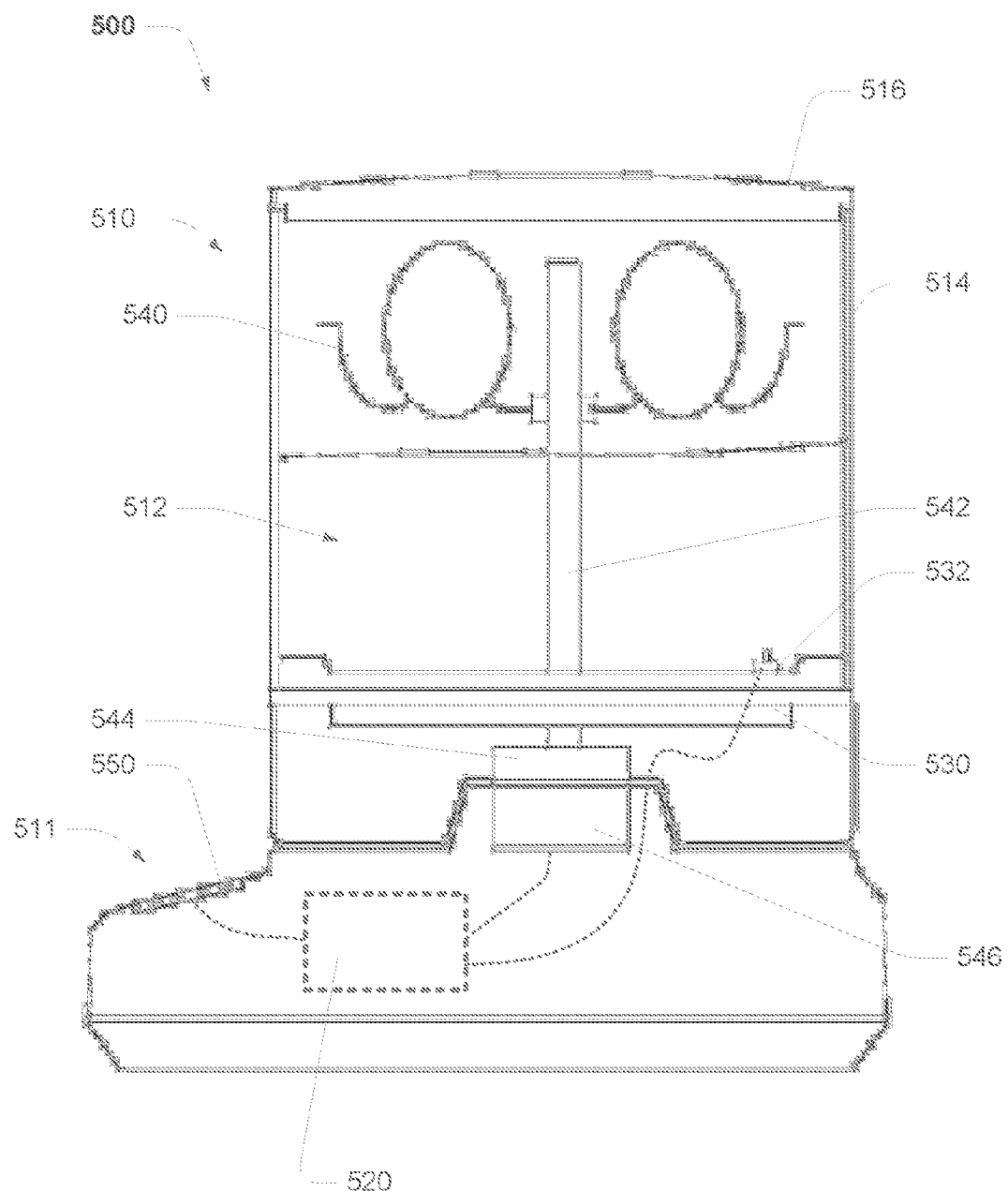
FIG. 27 is a schematic view of an embodiment sous vide device for cooking eggs.
Figure 28:
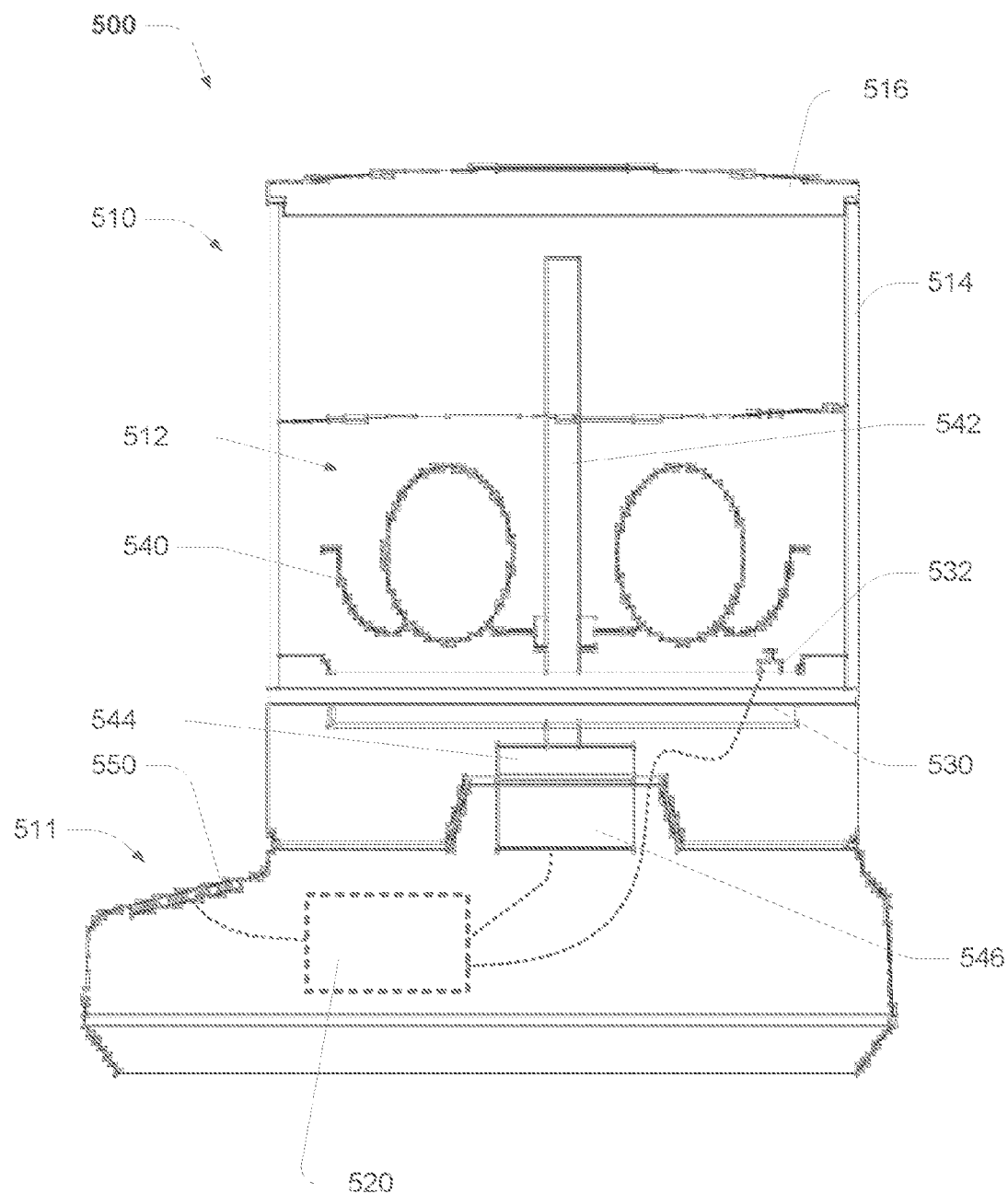
FIG. 28 is a schematic view of the sous vide device of FIG. 27, shown with eggs submerged in water.

FIG. 27 and FIG. 28 show schematic views of an embodiment sous vide device 500 for cooking eggs. FIG. 27 shows the device in a pre-cooking or post-cooking configuration. FIG. 28 shows the device in a cooking configuration.

The sous vide device 500 can be used to control both time and temperature for cooking one or more eggs. By independently controlling both water cooking temperature and cooking time, the device can cook eggs to a selected white texture and yolk texture.

In an embodiment, the device 500 includes a vessel 510 for cooking the eggs. The vessel retains water 512 which can be temperature regulated or controlled to a selected or predetermined temperature. A rack (or basket or platform) 514 is movable within the vessel 510, such that it can be automatically lowered into the heated water 512, and automatically raised from the water at the completion of cooking period. A processor element (or module) 520 typically maintains/controls the water temperature by enabling and disabling power supplied to a heating element 530. The processor element 520 can also monitor/control the cooking period for automatically lowering and raising the rack.

In an embodiment, the device 500 includes a removable cordless vessel 510 which is located and connected, with a corresponding base 511. The vessel includes a heating apparatus 530, and a temperature sensing element 532, which are typically coupled, to a processor element 520 for accurately heating the water in the vessel, and maintaining a desired cooking temperature (or temperature profile) over the cooking period.

In an embodiment, the device 500 includes a rack 540 that is vertically movable within the vessel 510 for lowering eggs into the water at the commencement of a cooking period (best shown in FIG. 28), and raising the eggs from, the water at the conclusion of the cooking period (e.g. as shown in FIG. 27). By way of example, the rack is coupled to a vertical drive element 542 that is driven through a coupling 544 by a motor 546. Tire vertical drive element can include, by way of example only, a driveshaft with a worm, drive for vertically moving the rack. In this example, the coupling 544 is driven, by a motor 546 in the base, which, is controlled by the processor element 520. However, it will be appreciated that the motor can be housed by the removable vessel 510, and controlled by the processor element 520 in the base 511.

In an embodiment, the base 511 can further include a user interface 550 for enabling user input, of cooking parameter's relevant to cooking eggs. The user interface can further include a display element for presenting data to the user. The user interface is coupled to the processor element (or module) 520.

In an embodiment, the vessel can include transparent side walls 514 (for example comprising glass or Pyrex) and/or a lid 516.

It would be appreciated, that in other embodiments, only power and communication (or data) signals may be required to be passed from the base to the vessel (for example rack motor control, data, heating element control data). Communication (or data) signals may also be passed from the vessel to the base (for example, temperature data and/or rack positional data or water level data).

Figure 29:
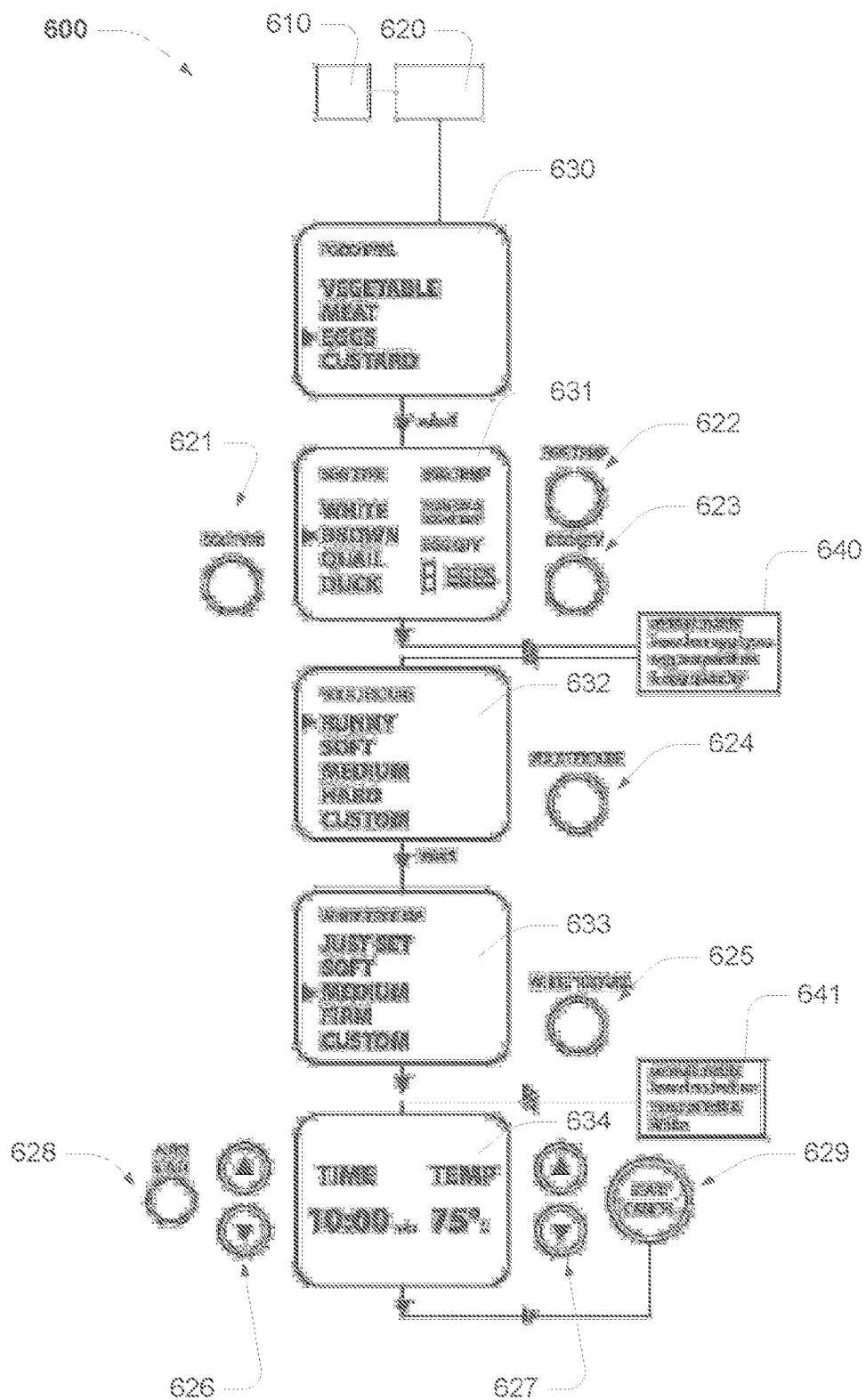
FIG. 29 is a schematic view of an embodiment user interface for a sous vide device.

FIG. 29 shows an embodiment user interface 600 for cooking eggs on a sous vide cooker. In an embodiment, by way of example only, the user interface 600 comprises one or more user input elements 610 coupled to a processor element 620. The processor element 620 being coupled to a display 630 for enabling user selection or configuration of cooking parameters.

In this embodiment, the display (at 630) presents user options for food types. By way of example, food types can including one of vegetables, meat, eggs, or custard. In the example, the user has selected 'eggs' proceeding to user display 631. The user display 631 enables the user to select any one or more of egg type using input element 621, egg temperature using input element 622 and egg quantity using input element 623. Based on these user inputs, processor element determines or calculates available egg yolk texture and egg white texture using stored data 640. The display then presents (at 632) options of egg yolk texture for user selection 624. The display then presents (at 633) options of egg white texture for user selection 625. With user selection of the yolk texture and white texture, a cooking time and temperature can be determined and/or calculated, which is presented in the display (at 634). The cooking time and cooking temperature can be further modified by the user, using user inputs 626 and 627 respectively. For or at commencement of cooking, the user can then select auto-start 628 or start/cancel 629.

In this embodiment, by way of example only, an LCD type display and user input for controlling a sous vide cooker. The LCD display provides a list of food types. The user scrolls through the food types until the arrow or cursor is adjacent to the user's selection. The user then makes the selection. The display then depicts three input selections which include a list or array of egg types, egg temperature and egg quantity based on the prior selection of eggs. The user scrolls through the egg type list using the arrow or cursor and makes a selection, in this example, "brown". Based on the egg type selection the user then cycles through the egg temperature list and makes a selection, in this example "room temp" followed by making a selection of egg quantity in this example "6 eggs". The controller utilises the data from a matrix or look up table based on the users selection and displays another selection variable being yolk texture. The display then provides a selection of yolk textures or "level of doneness". The user scrolls through the yolk textures until the arrow or cursor is adjacent to the user's selection. The user then makes the selection, in this example "runny". The display then provides a selection of white textures or "level of doneness". The user scrolls through the white textures until the arrow or cursor is adjacent to the user's selection. The user then, makes the selection, in this example "medium". Once all variables have been selected, the controller utilises the various data inputs from the selection process (food type, egg type, egg temp, egg qty, yolk texture and white texture) to determine (for example, from an algorithm, matrix or look up table) a selected cooking time and temperature. These values are displayed on the interface's display. The user can modify the suggested values of both time and temperature prior to initiating the cooking operation based upon the above mentioned input selections. However, once either time or temperature has been adjusted the display typically reverts to a "custom" selection for both yolk and white input texture doneness variables. It will be appreciated that the above input sequence can be performed in a different order.

In an embodiment, by way of example only, a start/cancel functionality allows the above mentioned, sequence to begin. The user interface may also offer a delayed start or auto start functionality. For example, the device can be configured with an input of time in hours & minutes both (AM or PM) selection. This functionality allows for the controller to communicate with the device to wake up from standby mode and perform the inputted cooking selection by the user.

It will be appreciated, that the device of FIG. 27 and FIG. 28 can automatically lower the basket, or rack apparatus, which lowers the eggs into the body of water. Alternatively a rack can be used which would be manually lowered into the body of water by the user prior to pressing start. It will be appreciated that, on completion of a cooking operation, the eggs would typically be removed and placed in cold water to achieve the most accurate results, which would gestured or displayed on the display (for example "remove eggs and place in cold water"). An audible alarm or beeps can be sounded on starting and/or completion and/or lowering the automatic basket or rack and/or raising of the automatic basket or rack.

Figure 30:
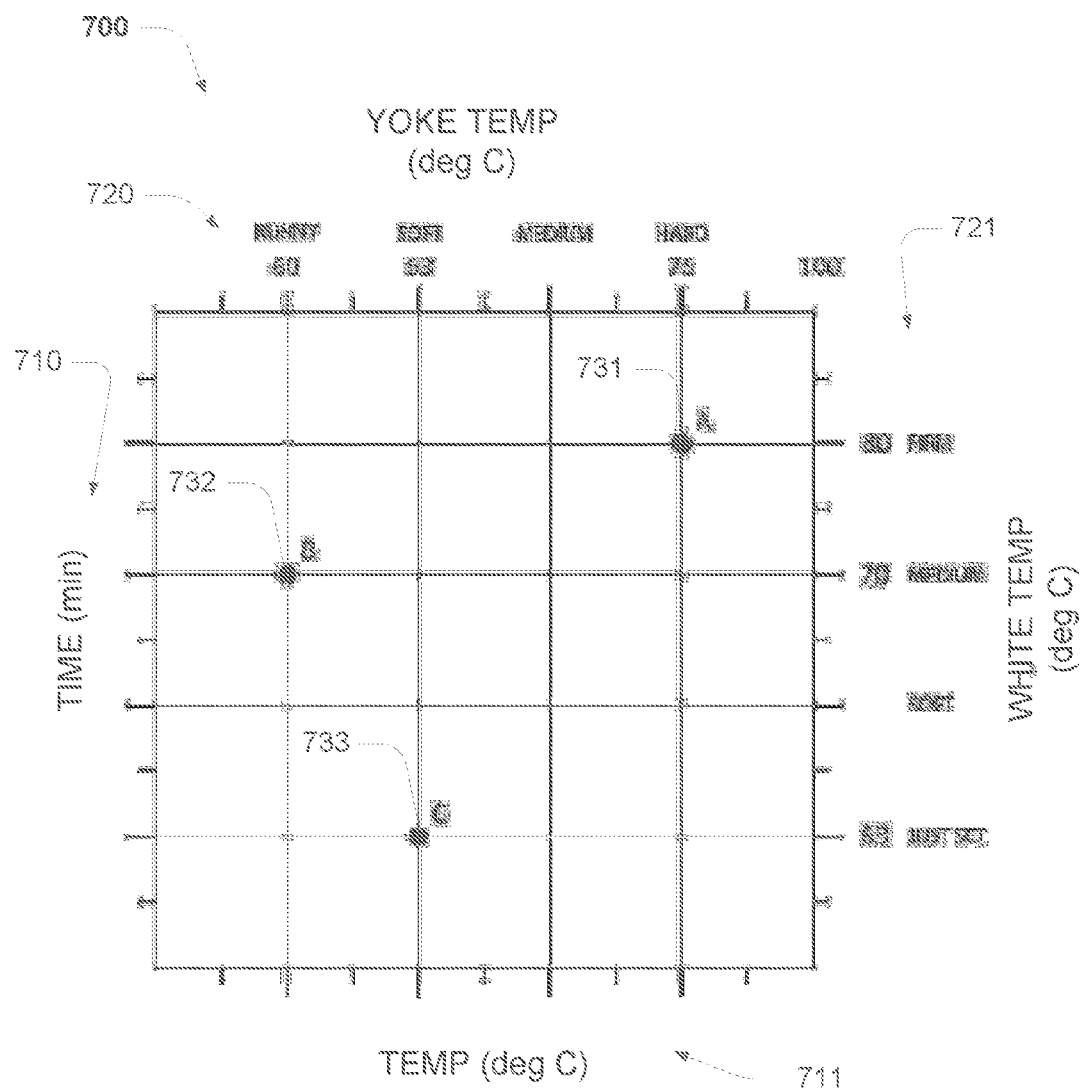
FIG. 30 shows an embodiment graph used to calculate cooking time and cooking temperature.

FIG. 30 shows an example graph 700, which can be stored and used to calculate cooking time 710 and cooking temperature 711 from user selection, of egg yolk texture 720 and egg white texture 721. It will be appreciated that this table may differ for various user selected egg types and/or egg temperatures and/or egg quantities. It will be appreciated that this table can be stored as a function or lookup table or other forms for referencing a cooking timer and cooking temperature based on user inputs.

This example table 700, three example control points 731, 732 and 733 are displayed. The control point 731, specifies a yolk texture of 'hard' and a white texture of 'firm'. The control point 732 specifies a yolk texture of 'runny' and a white texture of 'medium'. The control point 733 specifies a yolk texture of 'soft' end a white texture of 'just set'. The user selected egg yolk textures and egg white textures are then translated to a cooking temperature and cooking time.

FIG. 31A through FIG. 31D shows an example cooking profile for cooking an egg 800, being cooked to the specifications of set point 731. FIG. 31A shows a schematic diagram of an egg 800 cooking in a sous vide cooker. FIG. 31B shows the temperature profile 802 across an egg at the commencement of cooking, when first lowered into the water. In this example, at the commencement of cooking, the water temperature is boiling (100°) and the egg had a temperature of 10 degC. FIG. 31C shows the temperature profile 803 at a cooking time of 3:30 minutes, in which the temperature of the white and yolk have risen. In this example, at the 3:30 minutes, the water temperature is boiling (100°) and the egg white has reached a temperature of about 14-36 degC, and the egg yoke has reached a temperature of about 10-14 degC. FIG. 31D shows the temperature profile 804 at a cooking time of 7:00 minutes. In this example, at the 7:00 minutes, the egg white has reached a temperature of about 80 degC and the egg yolk has reached a temperature of about 75 degC. The difference in temperature 805 between egg white and egg yoke can provide different textures. The water is maintained at about 100 deg C throughout the cooking period. At the conclusion of the cooking period, the eggs can be raised from, the water.

FIG. 32A through FIG. 32D shows an example cooking profile for cooking an egg 810, being cooked to the specifications of set point 732. FIG. 32A shows a schematic diagram, of an egg 810 cooking in a sous vide cooker. FIG. 32B shows the temperature profile 812 across an egg at the commencement of cooking, when first lowered into the water, in this example, at the commencement of cooking, the water temperature is about 75 degC and the egg had a temperature of 10 degC. FIG. 32C shows the temperature profile 813 at a cooking time of 5:00 minutes, in which the temperature of the white and yolk have risen. In this example, at the 5:00 minutes, the water temperature is 75 degC and the egg white has reached a temperature of about 12-28 degC, and the egg yoke has reached a temperature of about 10-12 degC. FIG. 32D shows the temperature profile 814 at a cooking time of 10:00 minutes. In this example, at the 10:00 minutes, the egg white has reached a temperature of about 70 degC and the egg yolk has reached a temperature of about 60 degC lire difference in temperature 815 (being greater then the difference (805) between egg white and egg yoke can provide different textures. The water is maintained at about 75 degC throughout the cooking period. At the conclusion of the cooking period, the eggs can be raised from the water.

FIG. 33A through FIG. 33D shows an example cooking profile for cooking an egg 820, being cooked to the specifications of set point 732. FIG. 33A shows a schematic diagram, of an egg 820 cooking in a sous vide cooker. FIG. 33B shows the temperature profile 822 across an egg at the commencement of cooking, when, first lowered into the water. In this example, at the commencement of cooking, the water temperature is about 62 degC and the egg had a temperature of 10 degC. FIG. 33C shows the temperature profile 823 at a cooking time of 30:00 minutes, in which the temperature of the white and yolk have risen. In this example, at the 30:00 minutes, the water temperature is 62 degC and the egg white has reached a temperature of about 40-62 degC, and the egg yoke has reached, a temperature of about 30-40 degC. FIG. 33D shows the temperature profile 824 at a cooking time of 60:00 minutes. In this example, at the 60:00 minutes, the egg white has reached a temperature of about 62 degC and the egg yolk, has reached a temperature of about 62 degC. In this example, due to the extended, cooking time, the difference in temperature 825 between egg white and egg yoke is negligible. The water is maintained at about 62 degC throughout the cooking period. At the conclusion of the cooking period, the eggs can be raised from the water.

It will be appreciated, that a higher water temperature when cooking eggs at a shorter cooking period, a greater temperature gradient can be achieved across the yolk and white. A more even, temperature across the yolk and white can be achieved by using a lower temperature and cooking for a longer period. The greater the temperature gradient across the egg white and egg yolk, results in a greater variation between the white texture and yolk texture.

It will be appreciated, that the illustrated device provides an improved or alternative sous vide appliance.

It would be appreciated that, some of the embodiments are described herein as a method or combination of elements of a method that can be implemented by a processor of a computer system, or by other means of carrying out the function. Thus, a processor with the necessary instructions for carrying out such a method, or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such, as "processing", "computing", "calculating", "determining" or the like, can refer to the action and/or processes of a computer or computing system, or similar electronic computing device, that manipulate and/or transform, data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, per form a hie by one or more processors that accept computer-readable (also called machine-readable) code containing a set of instructions that when executed by one or more of the processors carry out at least one of the methods described herein. Airy processor capable of executing a set of instructions (sequential or otherwise) that specify actions to be taken is included.

Unless the context clearly requires other-wise, throughout the description and the claims, the words "comprise", "comprising", and the like are to be construed in an inclusive sense as opposed, to an exclusive or exhaustive sense; that is to say, in the sense of "including, but not limited to".

Similarly, it is to be noticed that the term "coupled", when used in the claims, should not be interpreted, as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output, of device A is directly connected to an input of device B. It means that there exists a path between an output of A and an input of B which may be a path including other devices or means, "Coupled" may mean that two or more elements are either in direct physical or electrical contact, or that two or mom elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given, sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would, be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each, claim standing on its own as a separate embodiment of this invention.

Furthermore, while some embodiments described herein include some but not other features included in other embodiments, combinations of features of different embodiments are meant to be within the scope of the invention, and form different embodiments, as would be understood, by those in the art. For example, in the following claims, any of the claimed embodiments can be used in any combination.

In the description, provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed, herein suitably may be practiced in the absence of any element winch, is not specifically disclosed herein.

The invention claimed is:

1. A device for cooking food, the device including:
a reservoir for retaining water;
a user interface having one or more user input elements and a display element;
a user interface receives user input of a food style, wherein the food style for a selected food type of eggs includes a user selected egg white texture and a user selected egg yolk texture;
a heating element for heating water in the reservoir;
a temperature sensor element for providing a temperature signal indicative of water temperature in the reservoir; and
a processor module, the processor module being coupled to the user interface for receiving the user inputs; the processor module being coupled to the temperature sensor element for receiving the temperature signal;
wherein the processor module control operation of the heating element for regulating the temperature of water in the reservoir based on the temperature signal, the cooking temperature and the cooking time;
wherein the processor module, from both the user selected egg white texture and the user selected egg yolk texture, determines both a corresponding cooking temperature and a corresponding cooking time.

2. The device according to claim 1, wherein egg white texture is selected from any one or more of the set comprising: firm; medium; soft; and just set.

3. The device according to claim 2, wherein the food style for a selected food type of eggs is selected from any one or more of the set comprising: soft, medium, hard, and poached.

4. The device according to claim 1, wherein egg yolk texture is selected from any one or more of the set comprising: hard; medium; soft; and runny.

5. The device according to claim 1, wherein the processor module determines the corresponding cooking temperature and the corresponding cooking time using a mapping of the user selected egg white texture and the user selected egg yolk texture.

6. The device according to claim 5, wherein the corresponding cooking temperature and the corresponding cooking time are predetermined for the selected combination of egg white texture and egg yolk texture; wherein processor module uses the user selected egg white texture to determine the corresponding cooking time, and uses the user selected egg yolk texture to determine the corresponding cooking temperature.

7. The device according to claim 1, wherein: based on user input, the processor determines a cooking profile comprising a predetermined sequence of cooking temperatures each having a respective cooking time within a single cooking period.

8. The device according to claim 7, wherein: in a first cycle, a food article is cooked at a first cooking temperature for a first cooking time; and then in a sequenced second cycle the food article is cooked at a second cooking temperature for a second cooking time.

9. The device according to claim 8, wherein the food item is allowed to cool to a third temperature at the conclusion of any cooking cycle.

10. The device according to claim 1, wherein a cooking temperature and a cooking time are predetermined; the device further including a movable food rack that can be lowered into the reservoir to define a cooking configuration; and wherein, when the processor module determines water in the reservoir has reached a predefined temperature, the food rack is lowered to commence a cooking period.

11. The device according to claim 1, the device further including:
a temperature probe for providing a signal indicative of food temperature;
wherein the processor module is coupled to the a temperature probe for receiving the signal indicative of food temperature; such that the processor module, upon determining a food temperature, can adjust the cooking temperature and/or cooking time.

12. The device according to claim 11, wherein the processor module is in wireless communication with the temperature probe.

13. A device for cooking eggs, the device including:
a reservoir for retaining water;
a user interface having one or more user input elements and a display element;
a temperature sensor element for providing a temperature signal indicative of water temperature in the reservoir;
a heating element for heating water in the reservoir;
a processor module, the processor module being coupled to the user interface for receiving user inputs of a food type and a food style; the processor module being coupled to the temperature sensor element for receiving the temperature signal;
the processor module controlling operation of the heating element to regulate the temperature of water in the reservoir;
wherein, upon user selection of an egg food type, user selection of a food style includes selection of an egg white texture and an egg yolk temperature; and
wherein the processor module determines a corresponding cooking temperature and corresponding cooking time, and controls operation of the device based on the temperature signal, the cooking temperature and the cooking time.

* * * * *